(12) United States Patent
Bouchard et al.

(10) Patent No.: US 11,773,992 B2
(45) Date of Patent: Oct. 3, 2023

(54) BACKFLOW PREVENTION ASSEMBLY WITH A LINKAGE

(71) Applicant: Watts Regulator Co., North Andover, MA (US)

(72) Inventors: Peter P. Bouchard, Ayer, MA (US); Kevin Simon, Somerville, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 17/566,278

(22) Filed: Dec. 30, 2021

(65) Prior Publication Data

US 2022/0412474 A1 Dec. 29, 2022

Related U.S. Application Data

(63) Continuation-in-part of application No. 17/402,737, filed on Aug. 16, 2021.

(60) Provisional application No. 63/066,411, filed on Aug. 17, 2020.

(51) Int. Cl.
*F16K 15/03* (2006.01)
*E03B 7/07* (2006.01)

(52) U.S. Cl.
CPC ............ *F16K 15/033* (2013.01); *E03B 7/077* (2013.01); *F16K 2200/101* (2021.08)

(58) Field of Classification Search
CPC .............. F16K 27/0209; F16K 15/033; F16K 2200/101; E03B 7/077; Y10T 137/7901
See application file for complete search history.

(56) References Cited

U.S. PATENT DOCUMENTS

| | | | |
|---|---|---|---|
| 213,394 | A | 3/1879 | Cornwall |
| 623,418 | A | 4/1899 | O'Meara |
| 953,940 | A | 4/1910 | Beam |
| 2,310,586 | A | 2/1943 | Lohman |
| 2,514,374 | A | 7/1950 | Cooper |
| 2,827,921 | A | 3/1958 | Sherman et al. |
| 3,173,439 | A | 3/1965 | Griswold et al. |

(Continued)

FOREIGN PATENT DOCUMENTS

| | | |
|---|---|---|
| CN | 110081212 A | 8/2019 |
| DE | 1925477 A1 | 12/1970 |

(Continued)

OTHER PUBLICATIONS

Ames Fire & Waterworks, division of Watts Industries, F-A-Spools/Flanges (2001) 4 pages.

(Continued)

*Primary Examiner* — Jessica Cahill
(74) *Attorney, Agent, or Firm* — Day Pitney LLP; George N. Chaclas; Anthony A. Kassas

(57) ABSTRACT

A check valve for a backflow prevention assembly includes a linkage with a platform having a proximal end and a distal end and a first coupling member supported by the platform for engaging a bias assembly. A stop protrudes from the proximal end of the platform to engage a frame of the check valve for limiting travel of the platform. A branch depends from the proximal end of the platform, the branch having a hinge pin configured to nest in a slot defined by check valve. A second coupling member depends from the distal end of the platform for engaging a valve member.

12 Claims, 18 Drawing Sheets

(56) References Cited

U.S. PATENT DOCUMENTS

| | | | |
|---|---|---|---|
| 3,189,037 A | 6/1965 | Modesto | |
| 3,429,291 A | 2/1969 | Hoffman | |
| 3,570,537 A | 3/1971 | Kelly | |
| 3,817,278 A * | 6/1974 | Elliott | F16K 37/0008 |
| | | | 137/527 |
| 3,837,357 A | 9/1974 | Slaughter | |
| 3,837,358 A | 9/1974 | Zieg et al. | |
| 3,859,619 A | 1/1975 | Ishihara et al. | |
| 3,896,850 A | 7/1975 | Waltrip | |
| 3,905,382 A | 9/1975 | Waterston | |
| 3,906,987 A | 9/1975 | Rushforth et al. | |
| 3,996,962 A | 12/1976 | Sutherland | |
| 4,014,284 A | 3/1977 | Read | |
| 4,244,392 A | 1/1981 | Griswold | |
| 4,284,097 A | 8/1981 | Becker et al. | |
| 4,416,211 A | 11/1983 | Hoffman | |
| 4,453,561 A | 6/1984 | Sands | |
| 4,489,746 A | 12/1984 | Daghe et al. | |
| 4,523,476 A | 6/1985 | Larner | |
| 4,618,824 A | 10/1986 | Magee et al. | |
| 4,667,697 A | 5/1987 | Crawford | |
| 4,694,859 A | 9/1987 | Smith, III | |
| 4,776,365 A | 10/1988 | Bathrick et al. | |
| 4,777,979 A | 10/1988 | Fwerdochlib | |
| 4,920,802 A | 5/1990 | McMullin et al. | |
| 4,945,940 A | 8/1990 | Stevens | |
| 5,008,841 A | 4/1991 | McElroy | |
| 5,024,469 A | 6/1991 | Aitken et al. | |
| 5,072,753 A * | 12/1991 | Ackroyd | E03C 1/104 |
| | | | 137/527 |
| 5,125,429 A | 6/1992 | Ackroyd et al. | |
| 5,236,009 A * | 8/1993 | Ackroyd | E03C 1/104 |
| | | | 137/454.2 |
| 5,299,718 A * | 4/1994 | Shwery | B65D 47/248 |
| | | | 137/903 |
| 5,404,905 A | 4/1995 | Lauria | |
| 5,425,393 A | 6/1995 | Everett | |
| 5,452,974 A | 9/1995 | Binns | |
| 5,520,367 A | 5/1996 | Stowers | |
| 5,551,473 A | 9/1996 | Lin et al. | |
| 5,566,704 A | 10/1996 | Ackroyd et al. | |
| 5,584,315 A | 12/1996 | Powell | |
| 5,586,571 A | 12/1996 | Guillermo | |
| 5,669,405 A | 9/1997 | Engelmann | |
| 5,711,341 A * | 1/1998 | Funderburk | F16K 27/0227 |
| | | | 137/527.2 |
| 5,713,240 A | 2/1998 | Engelmann | |
| 5,901,735 A | 5/1999 | Breda | |
| 5,918,623 A | 7/1999 | Hidessen | |
| 5,947,152 A * | 9/1999 | Martin | F16K 15/033 |
| | | | 137/527.2 |
| 5,992,441 A | 11/1999 | Enge et al. | |
| 6,123,095 A | 9/2000 | Kersten et al. | |
| 6,155,291 A | 12/2000 | Powell | |
| 6,170,510 B1 | 1/2001 | King et al. | |
| 6,343,618 B1 | 2/2002 | Britt et al. | |
| 6,349,736 B1 | 2/2002 | Dunmire | |
| 6,374,849 B1 | 4/2002 | Howell | |
| 6,378,550 B1 | 4/2002 | Herndon et al. | |
| 6,443,184 B1 | 9/2002 | Funderburk | |
| 6,471,249 B1 | 10/2002 | Lewis | |
| 6,513,543 B1 | 2/2003 | Noll et al. | |
| 6,546,946 B2 | 4/2003 | Dunmire | |
| 6,581,626 B2 | 6/2003 | Noll et al. | |
| 6,659,126 B2 | 12/2003 | Dunmire et al. | |
| 6,675,110 B2 | 1/2004 | Engelmann | |
| 7,051,763 B2 | 5/2006 | Heren | |
| 7,114,418 B1 | 10/2006 | Allen | |
| 7,434,593 B2 | 10/2008 | Noll et al. | |
| 7,506,395 B2 | 3/2009 | Eldridge | |
| 7,934,515 B1 | 5/2011 | Towsley et al. | |
| 8,220,839 B2 | 7/2012 | Hall | |
| 8,997,772 B2 | 4/2015 | Noll et al. | |
| 9,091,360 B2 | 7/2015 | Frahm | |
| 9,546,475 B2 | 1/2017 | Lu | |
| 9,899,819 B1 | 2/2018 | Holloway | |
| 9,995,605 B2 | 6/2018 | Konno et al. | |
| 10,132,425 B2 | 11/2018 | Di Monte | |
| 10,561,874 B2 | 2/2020 | Williams et al. | |
| 10,719,904 B2 | 7/2020 | Yasumuro et al. | |
| 10,883,893 B2 | 1/2021 | Shaw et al. | |
| 10,914,412 B2 | 2/2021 | Doughty et al. | |
| 10,962,143 B2 | 3/2021 | Cis et al. | |
| 11,137,082 B2 * | 10/2021 | Okuno | F16K 15/03 |
| 2002/0043282 A1 | 4/2002 | Horne et al. | |
| 2002/0078801 A1 | 6/2002 | Persechino | |
| 2003/0000577 A1 | 1/2003 | Noll et al. | |
| 2003/0168105 A1 | 9/2003 | Funderburk | |
| 2004/0045604 A1 | 3/2004 | Dunmire et al. | |
| 2004/0107993 A1 | 6/2004 | Stephens | |
| 2005/0092364 A1 | 5/2005 | Furuya et al. | |
| 2005/0199291 A1 | 9/2005 | Price et al. | |
| 2006/0076062 A1 | 4/2006 | Andersson | |
| 2006/0196542 A1 | 9/2006 | Yen | |
| 2007/0181191 A1 | 8/2007 | Wittig et al. | |
| 2007/0193633 A1 | 8/2007 | Howell et al. | |
| 2007/0204916 A1 | 9/2007 | Clayton et al. | |
| 2007/0204917 A1 | 9/2007 | Clayton et al. | |
| 2007/0240765 A1 | 10/2007 | Katzman et al. | |
| 2008/0145739 A1 | 6/2008 | Adams et al. | |
| 2008/0289567 A1 | 11/2008 | Gordon | |
| 2009/0136935 A1 | 5/2009 | Petersen | |
| 2009/0194719 A1 | 8/2009 | Mulligan | |
| 2011/0067225 A1 | 3/2011 | Bassaco | |
| 2011/0309076 A1 | 12/2011 | Liebenberg et al. | |
| 2012/0248759 A1 | 10/2012 | Feith | |
| 2013/0026743 A1 | 1/2013 | Baca | |
| 2013/0255452 A1 | 10/2013 | Kovach | |
| 2014/0109986 A1 | 4/2014 | Cordes | |
| 2017/0023141 A1 | 1/2017 | Andersson | |
| 2018/0156488 A1 | 6/2018 | Evans et al. | |
| 2019/0043157 A1 | 2/2019 | Yasumuro et al. | |
| 2019/0136935 A1 | 5/2019 | Hulstein et al. | |
| 2019/0162341 A1 | 5/2019 | Chiproot | |
| 2019/0271428 A1 | 9/2019 | O'Connor et al. | |
| 2019/0323618 A1 | 10/2019 | Fletcher et al. | |
| 2020/0141612 A1 | 5/2020 | Thibodeaux | |
| 2020/0370677 A1 | 11/2020 | Mendez | |
| 2021/0172157 A1 | 6/2021 | Burke et al. | |
| 2021/0230850 A1 | 7/2021 | Bouchard et al. | |
| 2021/0332898 A1 | 10/2021 | Cellemme | |

FOREIGN PATENT DOCUMENTS

| | | |
|---|---|---|
| DE | 8525261 U1 | 11/1985 |
| DE | 202014102568 U1 | 9/2015 |
| EP | 1521004 A1 | 4/2005 |
| EP | 3434833 A1 | 1/2019 |
| EP | 3832183 A1 | 6/2021 |
| FR | 2928750 A1 | 9/2009 |
| GB | 1231579 A | 11/1967 |
| JP | 2002213629 A | 7/2002 |
| WO | 2003060459 A1 | 7/2003 |
| WO | 2020023584 A1 | 1/2020 |

OTHER PUBLICATIONS

Apollo Valves PVB4A Series Installation, Operation and Maintenance Manual for Model PVB4A 1/2"-2" Pressure Vacuum Breaker Backflow Preventer, dated Jan. 11, 2012, 12 pages.

Conbraco BFMMPVB Maintenance Manual for Series 4V-500 1/2"-2" Pressure Type Vacuum Breaker (Apr. 2002) Conbraco Industries, Inc., Matthews, North Carolina 28106, 6 pages.

International Search Report and Written Opinion issued in corresponding international patent application No. PCT/US2021/046101, dated Nov. 22, 2021, 10 pages.

International Search Report and Written Opinion issued in corresponding international patent application No. PCT/US2021/046208, dated Dec. 1, 2021, 8 pages.

Lead Free Master Series LF870V product specifications pages, ES-F-LF-870V 1826 (2018) 4 pages.

(56) References Cited

OTHER PUBLICATIONS

Extended European Search Report issued in European patent application No. 20211811.3, dated May 4, 2021, 8 pages.
Watt TK-99E Backflow Preventer Test Kit Product Specifications and Test Information, IS-TK99E 0829 (2009) 4 pages.
Watts Water Company, Series 909RPDA for Health Hazard Applications (2016) 4 pages.
Watts Water Technologies Company, Installation, Maintenance & Repair Series 909, LF909, 909RPDA, LF909RPDA (2016) 8 pages.
Watts, "Double Check Valve Assembly Backflow Preventers, Bronze," Article 1 (2021) 6 pages.
Watts, "Reduced Pressure Zone Assembly Backflow Preventers, Bronze Body, Sizes 1/4-2 IN," Article 1 (2021) 16 pages.
Watts, S-RetroFit-Simple (2017) 2 pages.
Wilkins Company, Model 375/475MS Series, Installation, Maintenance and Instruction Sheet (2006) 1 page.
Apollo Valves PVB4A Series Installation, Operation, and Maintenance Manual, copyright May 2009, 9 pages.
European Search Report for European Patent Application No. 20192133.5 dated Feb. 1, 2021, 9 pages.
Watts Regulator Co., WATT ACV 113-6RFP Flood Protection Shutdown Valve for health Hazard Applications (2020) 4 pages.
Watts Water Technologies Company Brochure ES LF800M4QT for Health Hazard Applications Lead Free Series LF8M4QT Anti-Siphon Vacuum Breakers Sizes 1/2"-2", copyright 2013, 4 pages.
Zurn Wilkins 300AR Series, Backflow Preventor Order Form No. 480-060 (Apr. 2017) 2 pages.
International Search Report and Written Opinion issued in corresponding International Patent Application No. PCT/US2021/062395, dated Feb. 23, 2022, 7 pages.

* cited by examiner

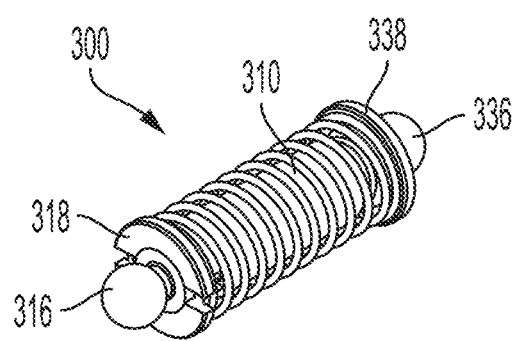
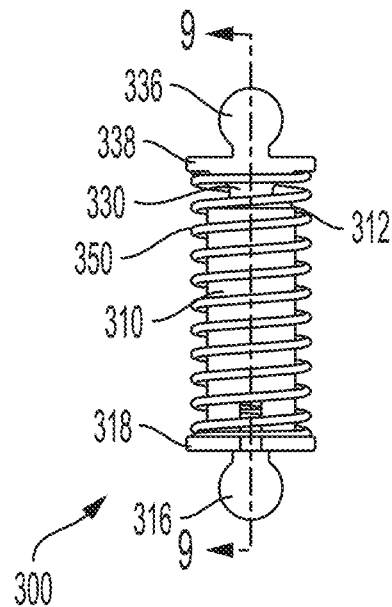
FIG. 7     FIG. 8
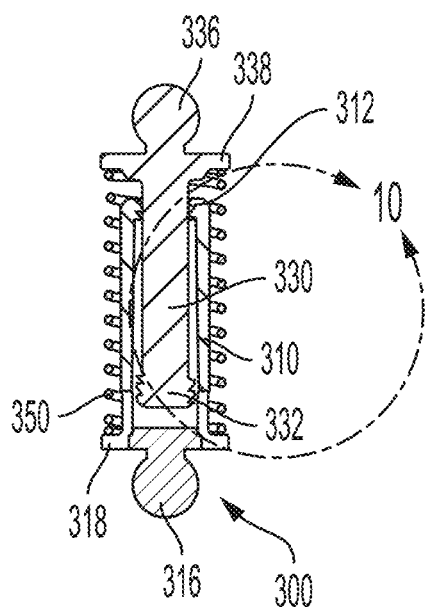
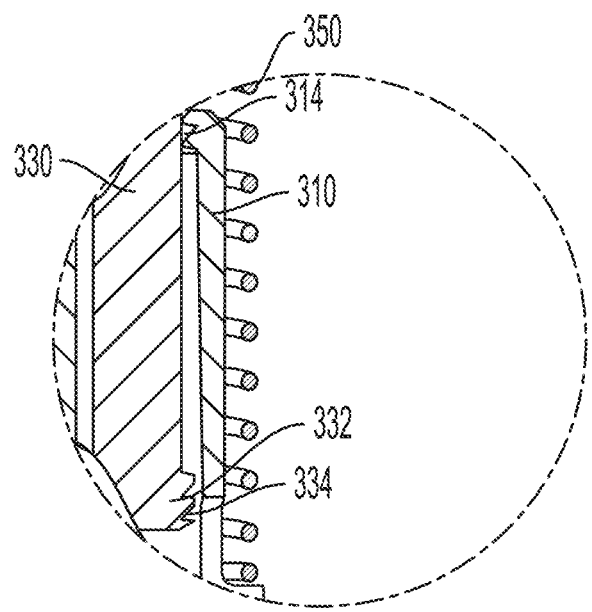
FIG. 9     FIG. 10

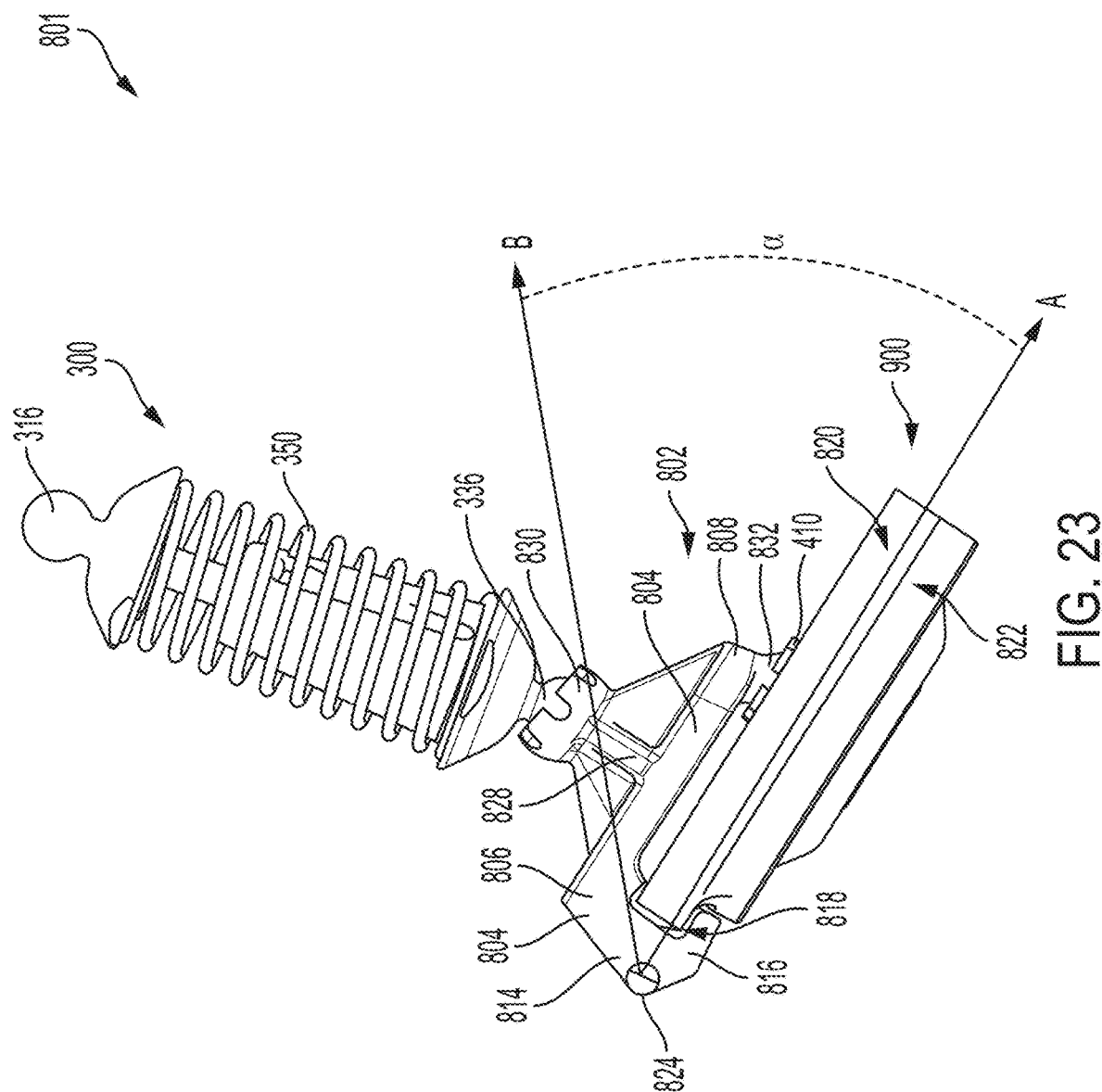

BACKFLOW PREVENTION ASSEMBLY WITH A LINKAGE

CROSS-REFERENCE

This application is a continuation-in-part of and claims the benefit of U.S. patent application Ser. No. 17/402,737, filed Aug. 16, 2021, which claims the benefit of U.S. Provisional Patent Application No. 63/066,411, filed Aug. 17, 2020, each of which is incorporated herein by reference.

FIELD OF THE DISCLOSURE

The subject disclosure relates to backflow prevention valves and assemblies, and more particularly to backflow prevention valves and assemblies having a spring retention assembly coupled to a linkage.

BACKGROUND

In many water systems, backflow prevention (BFP) assemblies allow fluid and even solids to flow only in a desired, i.e., a forward, direction. As backsiphonage or backflow can present contamination and health problems, the backflow prevention valves and assemblies prevent flow in an undesired direction, i.e., a backward or reverse direction. BFP assemblies are installed in buildings, such as residential homes, and commercial buildings and factories, to protect public water supplies by preventing the reverse flow of water from the buildings back into the public water supply.

A typical BFP assembly includes an inlet shutoff valve and an outlet shutoff valve with a backflow prevention valve assembly extending between the inlet and outlet shutoff valves. Many different configurations of BFP assemblies are commercially available, each being differently configured.

Owing to the fact that BFP assemblies are important for water safety, BFP units are tested annually, often per government regulations, to assure proper operating condition. Specifically, fluid pressure measurements are taken at specified locations in the BFP unit. If it is determined that a check valve needs to be repaired or replaced, the inlet and outlet shutoff valves have to be closed, the check valve fixed and tested, the shutoff valves opened and the apparatus confirmed to be operating per any required ordinances and/or standards. The process is time-consuming and the steps have to be performed in the correct sequence and manner in order to not contaminate the public water supply, inadvertently flood an area, and return the BFP assembly to working order.

SUMMARY

From time to time, various components of a BFP assembly lock the BFP assembly in an open position. For example, where an upstream pressure on a valve member exceeds the closing force, the normally-closed valve member will open. On occasion, the valve member may open at a wide enough angle, past a point of return. There, the bias spring may force the valve member open. A stop on the BFP assembly or on a linkage provides the benefit of preventing the valve member from opening at such an angle.

Additionally, a valve member having a rigid connection to a linkage, spring, or other component in a BFP assembly may fail to seat easily or properly on a valve seat. For example, when the force provided by the bias spring overcomes the opening forces, the valve member is urged against the valve seat. The valve member in such a rigid connection may not have freedom of movement to adjust against the valve seat to easily close an opening of the assembly. As a result, additional force or other considerations may need to be provided to insure desired closure below the cracking pressure. An adaptable coupling configuration between a linkage and the valve member enables the valve member to adjust against the valve seat. Further, the linkage may provide leverage to assist in movement of the valve member between positions.

Lastly, various components of a BFP assembly may need replacement, which is not only difficult and time consuming but results in downtime for the fluid network. Components for the BFP assembly that are easier to manufacture, assemble and install as well as more robust would reduce: the difficulty of fabrication and repair; repair time; assembly error from improper fabrication or otherwise; and the difficulty of installation. Preferably, a telescoping spring retainer assembly provides some or all of these benefits along with reducing the required components. When the telescoping spring retainer assembly is coupled to a linkage, these benefits are further enhanced.

The subject technology is directed to a check valve for a backflow prevention assembly including a platform with a proximal end and a distal end and a first coupling member supported by the platform for engaging a bias assembly. A stop protrudes from the proximal end of the platform to engage a frame of the check valve for limiting travel of the platform. A branch depends from the proximal end of the platform, the branch having a hinge pin configured to nest in a slot defined by check valve. A second coupling member depends from the distal end of the platform for engaging a valve member.

In another implementation, the branch may form an alcove, a periphery of the valve member fitting in the alcove. The hinge pin, alcove, first coupling member, and second coupling member may allow self-alignment of the valve member relative to a valve opening. The hinge pin, first coupling member, and second coupling member may form a triangle to increase a mechanical advantage to help fully open the valve member. The first coupling member may be centrally located above the platform by a strut. The stop may include one or more wing appendages. The geometric features of the check valve may allow for tool-less and fastener-less drop-in assembly into the backflow prevention assembly.

The subject technology is directed to check valve for a backflow prevention assembly including a platform with a proximal end and a distal end and a first coupling member supported by the platform for engaging a bias assembly. A branch depends from the proximal end of the platform, the branch having a hinge pin configured to nest in a slot defined by check valve. The check valve includes a second coupling member depending from the distal end of the platform for engaging a valve member. A first axis from the hinge pin to the first coupling member and a second axis from the hinge pin to the second coupling member form a strut angle that increases a mechanical advantage for fully opening the valve member to decrease pressure drop across the check valve In another implementation, the check valve may include a stop protruding from the proximal end of the platform to engage a portion of the check valve for limiting travel of the platform. The check valve may also include one or more struts extending from the platform, wherein a height of the one or more struts determines the strut angle.

The subject technology is directed to a backflow prevention assembly including a valve member having a first side and a second side, the first side having a receiving member, and the second side forming a sealing region. The backflow prevention assembly includes a check valve including: a platform having a proximal end and a distal end defining a plane; a first coupling member supported by the platform; a branch depending from the proximal end of the platform, the branch having a hinge pin configured to nest in a slot defined by the frame of the check valve, the branch having an arm forming an alcove; and a second coupling member depending from the distal end of the platform for engaging the receiving member. The backflow prevention assembly includes a bias assembly. The first coupling member engages the bias assembly. The arm loosely supports the valve member in the alcove and the receiving member of the valve member captures the second coupling member to allow for rotational movement therein to self-align to a valve opening In another implementation, the backflow prevention assembly may include a stop protruding from the proximal end of the platform to engage the frame of the check valve for limiting travel of the platform. The backflow prevention assembly may also include one or more struts extending from the platform to support the first coupling member. A first axis from the hinge pin to the first coupling member and a second axis from the hinge pin to the second coupling member may form a strut angle that increases a mechanical advantage for fully opening the valve member to decrease pressure drop across the check valve In another implementation the second coupling member and the receiving member may be a ball and socket respectively. The hinge pin, the slot, the first coupling member and the bias assembly, the second coupling member and the receiving member, and the alcove may all allow the valve member to self-align to a valve opening.

In another implementation the backflow prevention assembly may include a second valve member, a second check valve, and a second bias assembly located within the backflow prevention assembly.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

FIG. 7 is a perspective view of the telescoping spring retainer assembly of FIG. 3 in a compressed position.

FIG. 8 is a plan view of the telescoping spring retainer assembly of FIG. 7.

FIG. 9 is a cross-sectional view of the telescoping spring retainer assembly taken along line 9-9 of FIG. 8.

FIG. 10 is a partial detailed cross-section view of the telescoping spring retainer assembly shown in circle 10 of FIG. 9.

FIG. 23 is a perspective view of a portion of a valve assembly including a spring retention assembly coupled to a linkage and a valve member.

DETAILED DESCRIPTION

Figure 1:
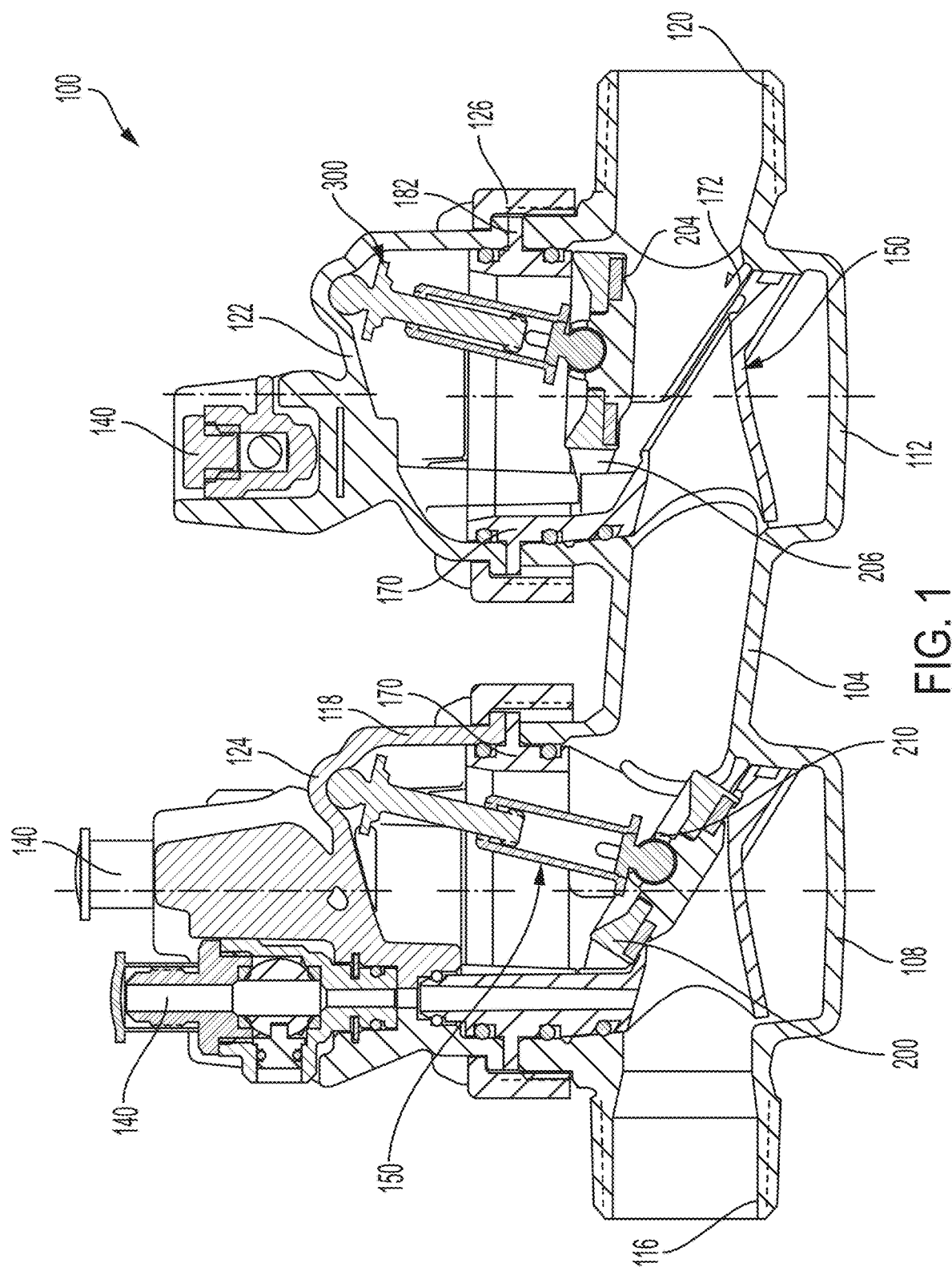
FIG. 1 is a cross-sectional view of a backflow prevention BFP assembly with only the second check valve assembly open in accordance with the present disclosure.

The subject technology overcomes many of the prior art problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
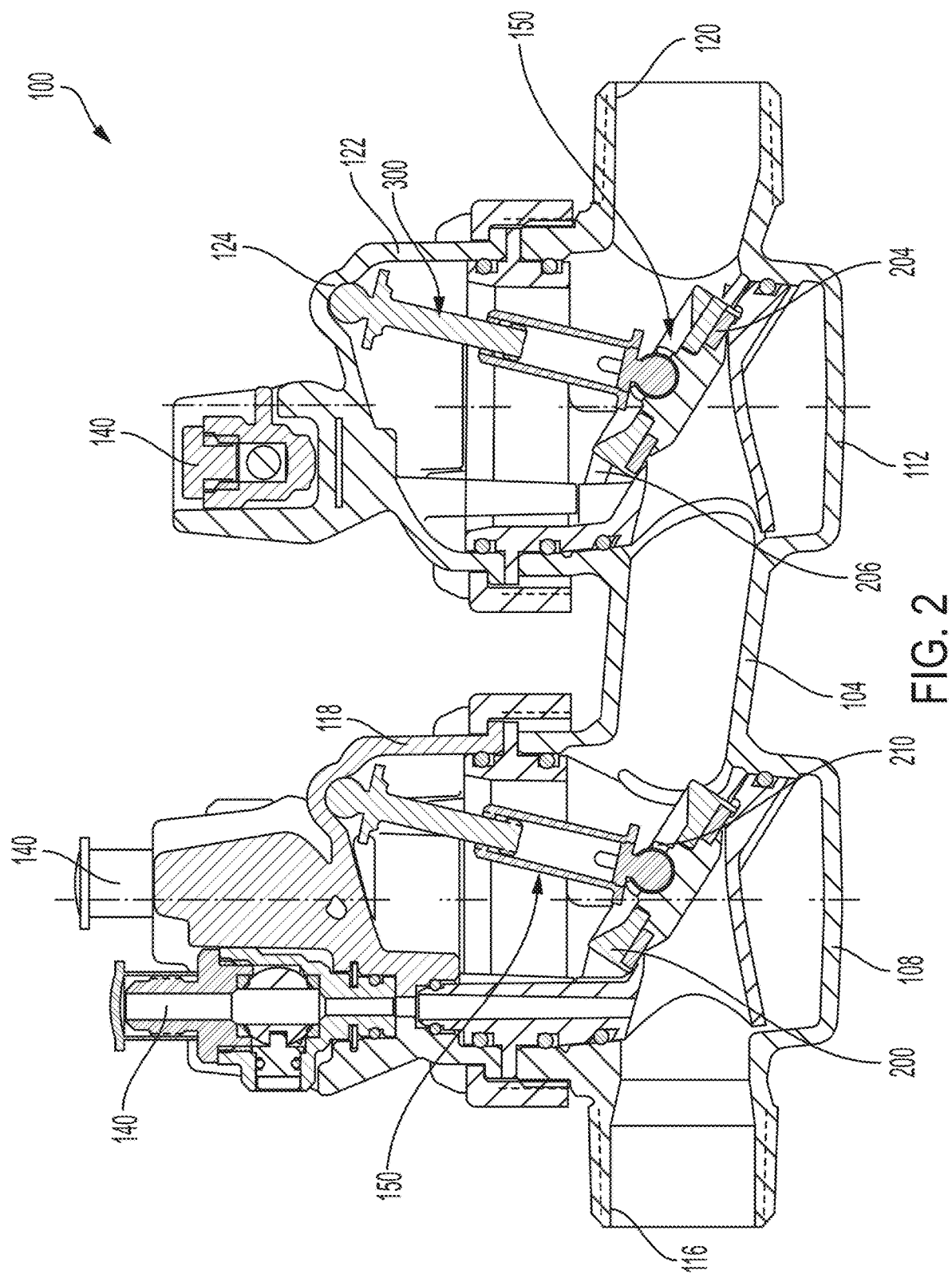
FIG. 2 is a cross-sectional view of the BFP assembly of FIG. 1 with both check valve assemblies closed in accordance with the present disclosure.

Referring now to FIGS. 1 and 2, there is shown a backflow prevention (BFP) assembly 100 in accordance with an aspect of the present disclosure. The BFP assembly 100 may be installed in a fluid system, e.g., a water supply for a building. In normal operation, the backflow prevention assembly 100 operates to carry fluid in only a forward direction, e.g., left to right in FIGS. 1 and 2, from an inlet 116 to an outlet 120. The BFP assembly 100 operates to prevent flow in a backward direction, i.e., a direction from right to left in FIGS. 1 and 2.

The BFP assembly 100 includes a body 104 forming an upstream bucket 108 and a downstream bucket 112. Each bucket 108, 112 is enclosed by a test cover 118, 122. The test covers 118, 122 may include one or more test cocks 140 for sensing pressure at various locations within the BFP assembly 100. The upstream test cover 118 includes two test cocks 140 and the downstream test cover 122 includes a single test cock 140 but the test covers 118, 122 are otherwise very similar.

Each bucket 108, 112 includes a check valve assembly 150 for selectively opening and closing flow through the respective bucket 108, 112. Preferably, the check valve assemblies 150 are interchangeable although as shown, the check valve assemblies 150 are different. Each check valve assembly 150 has frame 170 fit into the respective bucket 108, 112. The frame 170 retains a valve member 200, which selectively closes against a circular valve seat 172 of the frame 170. The valve members 200 are generally disc-shaped with an annular sealing region 204 that seals against the valve seat 170. The valve member 200 is connected to the frame 170 by a hinge portion 206 that allows rotation of the valve member 200 away from the valve seat 172 to open flow.

In each check valve assembly 150, a spring retainer assembly 300 provides a biasing force to urge the valve member 200 against the valve seat 172. If the pressure downstream of the valve member 200 exceeds the force of the spring retainer assembly 300, the check valve assembly 150 will open to allow forward flow. If not, the spring retainer assembly 300 will keep the check valve assembly 150 closed. The spring retainer assembly 300 extends between the respective test cover 118, 122 and the valve member 200. The test covers 118, 122 form hollows 124 for coupling to the spring retainer assembly 300 whereas the valve member 200 has a retention cup 210 for coupling to the spring retainer assembly 300.

Referring now to FIGS. 3-10, various views of the spring retainer assembly 300 are shown. The spring retainer assembly 300 includes a telescoping central portion 302. The telescoping central portion 302 includes a somewhat tubular cylinder portion 310 with an open lip end 312. The open lip end 312 has internal threads 314 best seen in FIGS. 6 and 10. A closed free end 316 opposes the open lip end 312 and has a spherical or bulbous shape for coupling to the retention cup 210 of the valve member 200 or in the hollow 124 of the test cover 118, 122, as the case may be. Adjacent the bulbous closed free end 316, a retention collar 318 is formed.

The spring retainer assembly 300 also includes a piston portion 330 that partially slides within the cylinder portion 310. The piston portion 330 has a tab end 332 that is captured within the cylinder portion 310. The tab end 332 has outer threads 334. To couple the cylinder portion 310 and the piston portion 330 together, the tab end 332 is threaded through the open lip end 312 of the cylinder portion 310. Once coupled, the tab end 332 can slide within the cylinder portion 310 but is retained by the lip end 312 until unscrewed.

Figure 3:
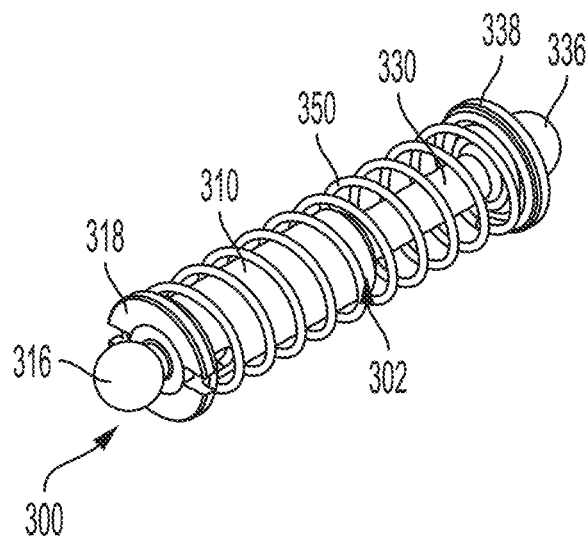
FIG. 3 is perspective view of a telescoping spring retainer assembly in an extended position for a check valve assembly for a BFP assembly in accordance with the present disclosure.
Figure 4:
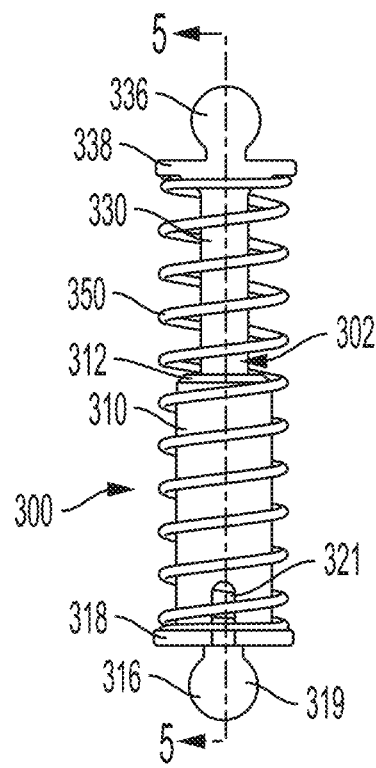
FIG. 4 is a plan view of the telescoping spring retainer assembly of FIG. 3.
Figure 5:
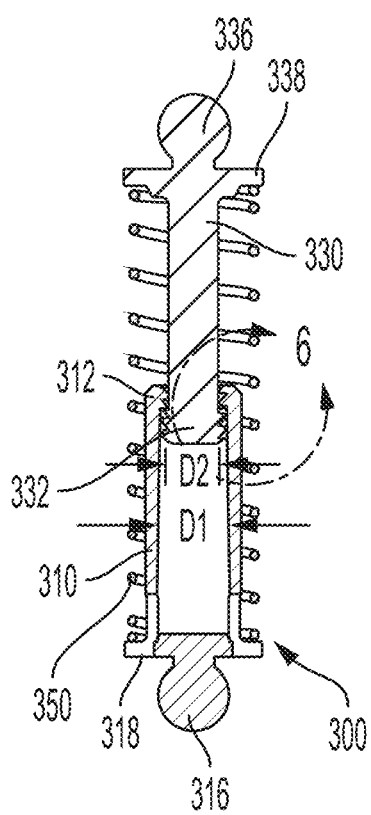
FIG. 5 is a cross-sectional view of the telescoping spring retainer assembly taken along line 5-5 of FIG. 4.

The piston portion 330 has a free end 336 with a retention collar 338. A spring 350 is captured and compressed between the retention collars 318, 338 to urge the cylinder portion 310 and piston portion 330 apart as best seen in FIGS. 3-5. Thus, when in the spring retainer assembly 300 is in place between the fixed rigid hollow 124 of a test cover 118, 122 and retention cup 210 of the valve element 200, the spring 350 provides the biasing force to urge the valve element 200 closed (see FIGS. 1 and 2).

As illustrated in FIGS. 7-10 and shown in the downstream check valve assembly 150 of FIG. 2, the spring retainer assembly 300 is compressed by opening of the check valve assembly 150 when the upstream pressure on the valve member 200 exceeds the force provided by the spring 350. In other words, the force of the spring 350 is predetermined to allow the valve element 200 to permit the normal flow of fluid in the forward direction.

Figure 6:
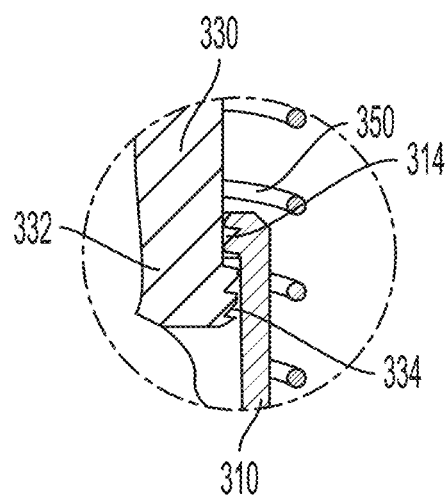
FIG. 6 is a partial detailed cross-section view of the telescoping spring retainer assembly shown in circle 6 of FIG. 5.

In order to minimize wobbling or lateral motion of the piston portion 330 during sliding, an inner diameter D1 of the cylinder portion 310 is approximately the same as the outer diameter D2 of the threaded tab end 332 (see FIG. 6). The threaded tab end 332 also has sufficient length along the axis of movement to be stable inside the cylinder portion 310. In this way, the piston portion 330 moves linearly and is prevented from wobbling. The length of the threaded tab end 332 and cylinder portion 310 are selected to minimize wobbling while still allowing sufficient travel for a fully open and closed check valve 150.

In normal operation, the force exerted by the respective spring retainer assembly 300 on the valve elements 200 is overcome by the pressure exerted by the fluid normally flowing from the inlet 116 to the outlet 120 so that both check valves 150 are open. If, for example, there is a drop in pressure from the supply source, the upstream valve element 200 and the downstream valve element 200 will close to prevent backflow as shown in FIG. 2. Similarly, if the normal forward flow is interrupted, one or both of the valve elements 200 is urged in position to cover the valve seat 172 (e.g., FIGS. 1 and 2, respectively) to close the check valve 150 and prevent backflow.

To assemble a check valve 150, the threaded tab end 332 of the piston portion 330 is screwed through the threaded lip end 312 of the cylinder portion 310 to couple the piston portion 330 to the cylinder portion 310. Either end 316, 336 may be coupled to the retention cup 210 of the valve element 200 because each end 316, 336 is similarly shaped. Preferably, the retention cup 210 is flexible and deforms slightly to receive the spherical end 316, 336 without requiring any tools. Once popped in, the bulbous end 316, 336 easily rotates within the retention cup 210. As the test cover 118 is mounted on the check valve 150, the other end 316, 336 of the spring retention assembly 300 is aligned to the hollow 124, which captures the end 316, 336 while also allowing for easy rotation of the end 316, 336 therein. Thus, the spring retention assembly 300 can be arranged in a reverse arrangement to that which is shown and assembly is simplified.

Repair of the spring retention assembly 300 is also simplified. For example, if the piston portion 330 is broken, the threaded tab end 332 is unthreaded from the cylinder portion 310. To replace the broken piston portion 330, a new piston portion 330 can be threaded into the previously used cylinder portion 310. Similarly, without tools, the portions 310, 330 can be separated to replace the helical spring 350.

In one embodiment, the ends 316, 318 include a spherical portion 319 having a threaded post 321 that screws into or otherwise mounts to the retention collar 318, 338. Hence, the threaded posts 312 are the same so that fewer parts are required and manufacturing and repair is simplified. Further, as tools are not required, assembly is simplified. In another embodiment, the ends 316, 318 are different sizes to preclude reversibility. For example, only one end 316, 318 may be small enough to fit into the retention cup 210 so that there is only one orientation that couples the spring retention assembly 300 to the valve element 200.

In another embodiment, the spring retention assembly does not include a helical spring around the outside. Instead, the helical spring or even a compressible insert is provided with the cylinder portion to generate the proper bias.

Figure 11A:
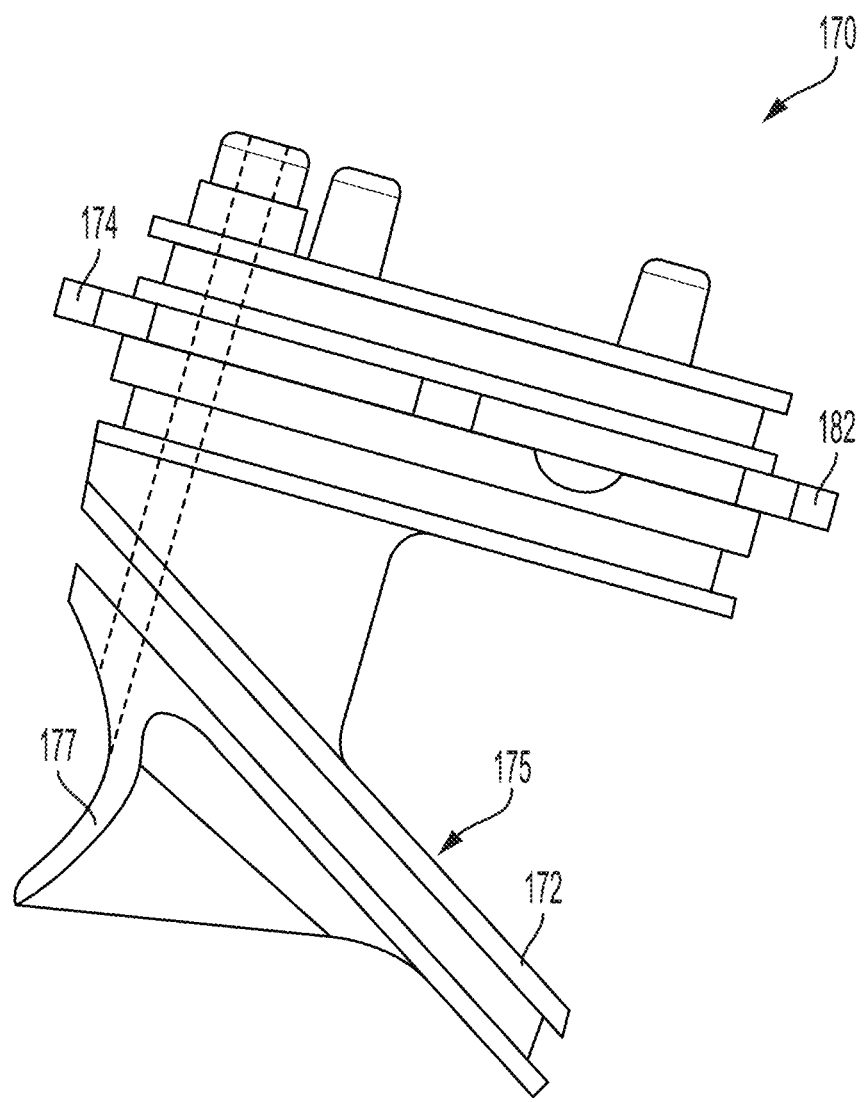
FIG. 11A is an isolated side view of a frame for use in a check valve assembly in accordance with the subject disclosure.
Figure 11B:
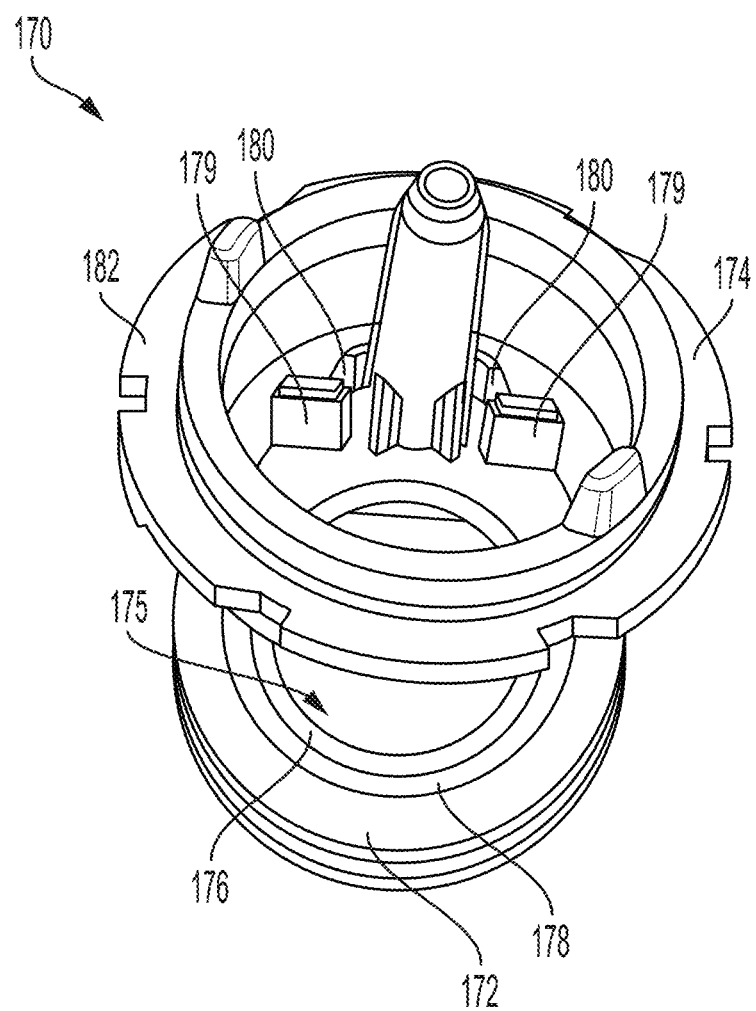
FIG. 11B is an isolated perspective view of a frame for use in a check valve assembly in accordance with the subject disclosure.

Referring now to FIGS. 11A and 11B, isolated side and perspective views of a frame 170 for use in a check valve assembly in accordance with the subject disclosure are shown. The frame 170 snugly fits into the respective bucket. A top portion 174 seals against the BFP assembly body and a lower portion 177 narrows the fluid path through the BFP assembly to an opening 175 of the valve seat 172. The top portion 174 includes a circular ledge 182 that acts as an insertion hardstop. A retaining nut 126 (see FIG. 1) threads onto the body 104 to secure the frame 170 thereto. The valve seat 172 also includes an annular raised rim 176 as a sealing surface with a recess 178 surrounding the rim 176.

The frame 170 includes standoff 178 adjacent the opening 175 and forming a pair of opposing notches 180. The notches 178 may be U-shaped to receive a valve member such that the valve member is hinged to the frame 170 for selective opening and closing of the opening 175. The notches 178 may also simply be holes or similar shape to receive a protruding tab to create a hinge arrangement.

Figure 12:
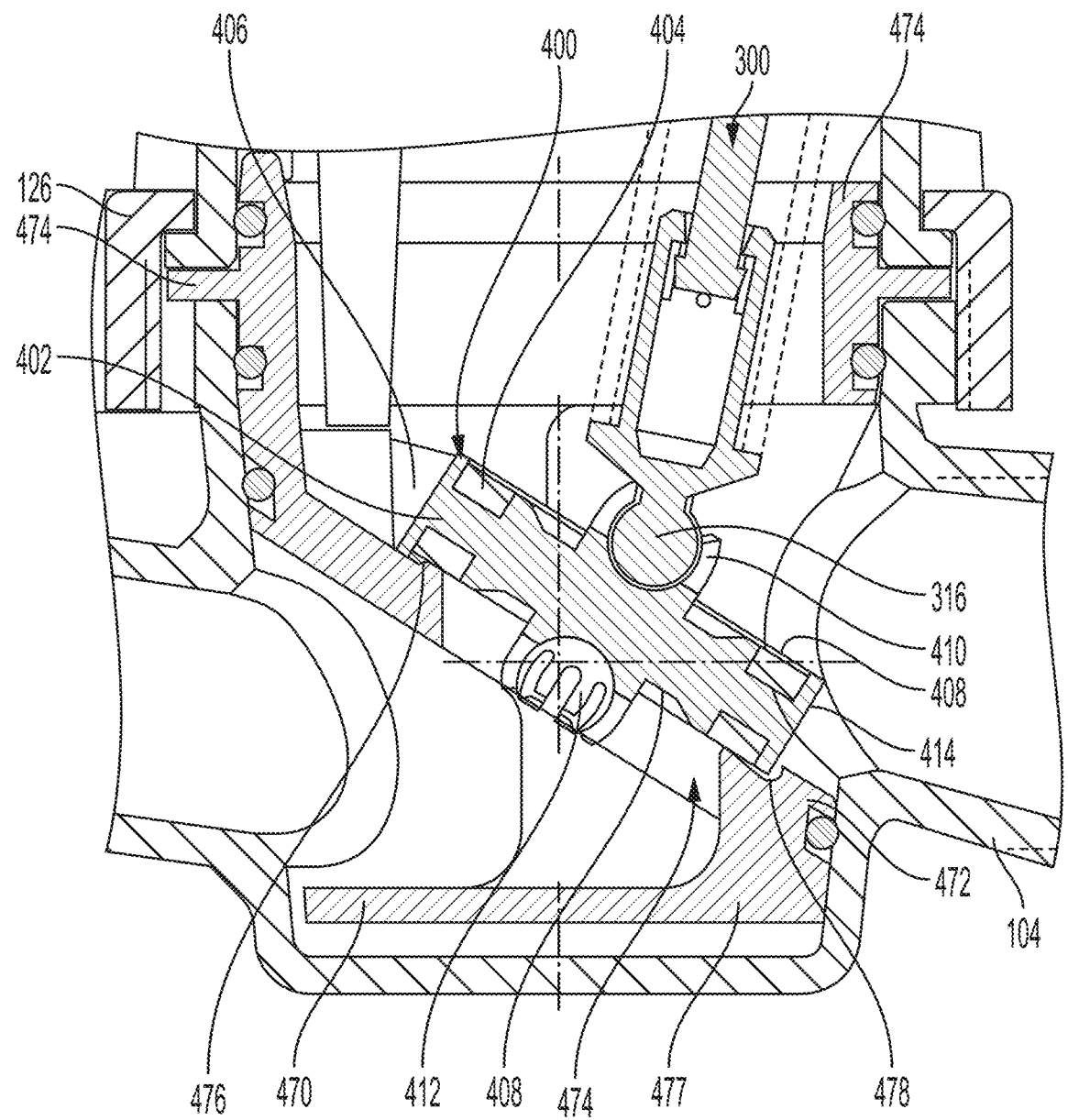
FIG. 12 is a partial cross-sectional view of a reversible valve member coupled to a frame in a check valve assembly in accordance with the subject disclosure.

Referring now to FIG. 12, a partial cross-sectional view of a reversible valve member 400 coupled to a frame 470 in a check valve assembly of a BFP assembly in accordance with the subject disclosure is shown. Like reference numerals in the "400" series are used to refer to similar elements between the frame 170 and the frame 470. Similarly "400" series numbers are also used to describe like elements between the valve members 200, 400 so that the following description can be directed to the differences.

The valve member 400 is reversible by being symmetrical. The valve member 400 has a central disc 402. Each side of the central disc 402 has a central retention cup 410. The cups 410 have a plurality of fingers 412 that deflect to allow manual insertion of the end 316 of the spring retention assembly 300 to capture the end 316 therein. Once captured, the end 316 can smoothly rotate within the cup 410 like a ball-and-socket joint. Similar connections like a condyloid joint, saddle joint, hinge joint, pivot joint and the like may be used. The valve member 400 also has a radially outward ring-shaped sealing region 404 on each side 408. An outer edge 414 of the central disc 402 may be relatively thicker than the sealing region 404. The hinge portion 406 extends from the outer edge 414 of the central disc 402. In one embodiment, the sealing surface 476 is a ring-shaped elastomeric insert on each side 408.

Once assembled, as shown in the closed position in FIG. 12, the spring retention assembly 300 urges the valve member 400 against the valve seat 472. The sealing region 404 of the valve member 400 and the sealing surface 476 of the frame seat 172 are sealingly engaged to close the opening 475. When the upstream fluid pressure exceeds the urging force of the spring retention assembly 300, the valve member 400 rotates to open the opening 475 and, in turn, the end 316 rotates within the deflectable fingers 412 of the retention cup 410.

By being symmetrical, the valve member 400 can be arranged in a reverse arrangement and work in the same manner. Thus, assembly is simplified. Further, repair of the valve member 400 is also simplified. For example, if the valve member 400 is broken on one side in the field, rather than locate a replacement part, the valve member 400 can be unhinged, flipped and rehinged. As a result, the required number of parts is reduced with assembly and repair simplified. Preferably, tools are also not required.

Figure 13A:
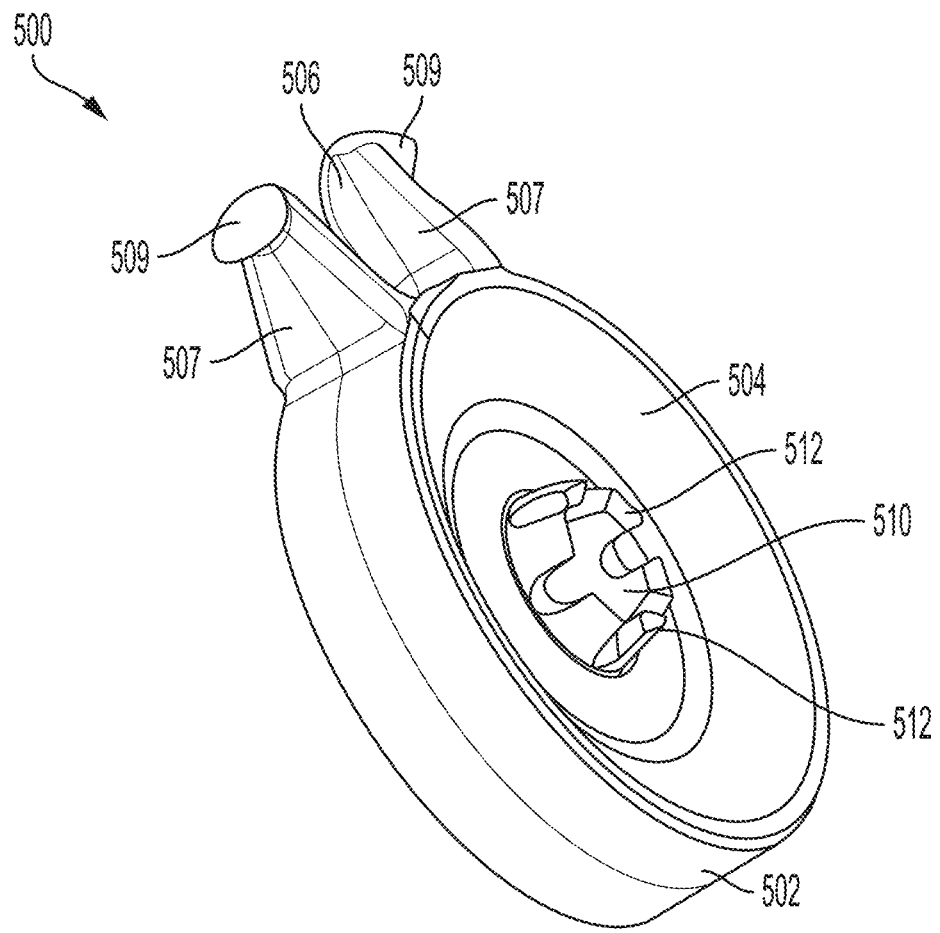
FIG. 13A is an isolated perspective view of another reversible valve element for use in a check valve assembly in accordance with the subject disclosure.
Figure 13B:
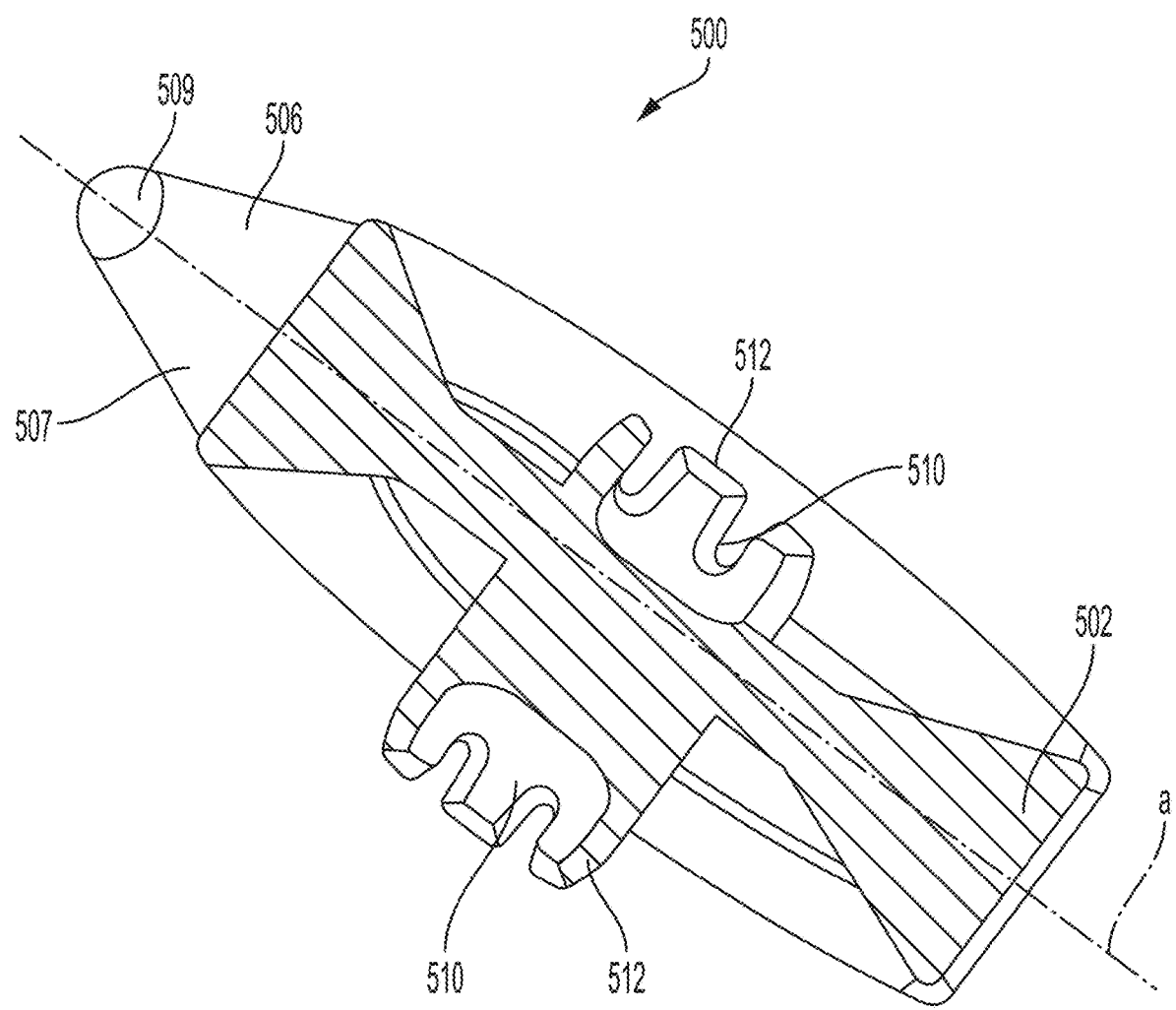
FIG. 13B is a cross-sectional view of the reversible valve member of FIG. 13A.

Referring now to FIGS. 13A and 13B, isolated views of another reversible valve member 500 for use in a check valve assembly in accordance with the subject disclosure are shown. As will be appreciated by those of ordinary skill in the pertinent art, the valve member 500 utilizes similar principles to the valve members 200, 400 described above. Accordingly, like reference numerals in the "500" series are used to indicate like elements.

The primary difference of the valve member 500 is the sloped sealing region 504 as best seen in FIG. 13B. The sloped sealing region 504 may be formed by partially fully coating the central disc 502. Alternatively, the entire central disc 502 may be formed from an elastomeric or other material with the desired sealing properties. The valve member 500 is still symmetrical about an axis of symmetry "a" for reversibility.

The hinge portion 506 includes a pair of opposing radially extending flexible arms 507. The arms 507 have distal tabs 509 protruding outward to engage the frame. By manually deflecting the arms 507 inward (e.g, closer together), the tabs 509 can be snap-fit into the notches of the frame. In another embodiment, the hinge portion and the standoff of the frame have transverse passages for receiving a hinge pin to create the hinge. It is envisioned that the tabs 509 may simply rest in the notches with the force of the spring assembly being sufficient so that the tabs 509 float in place to allow easy freedom of movement.

Figure 14:
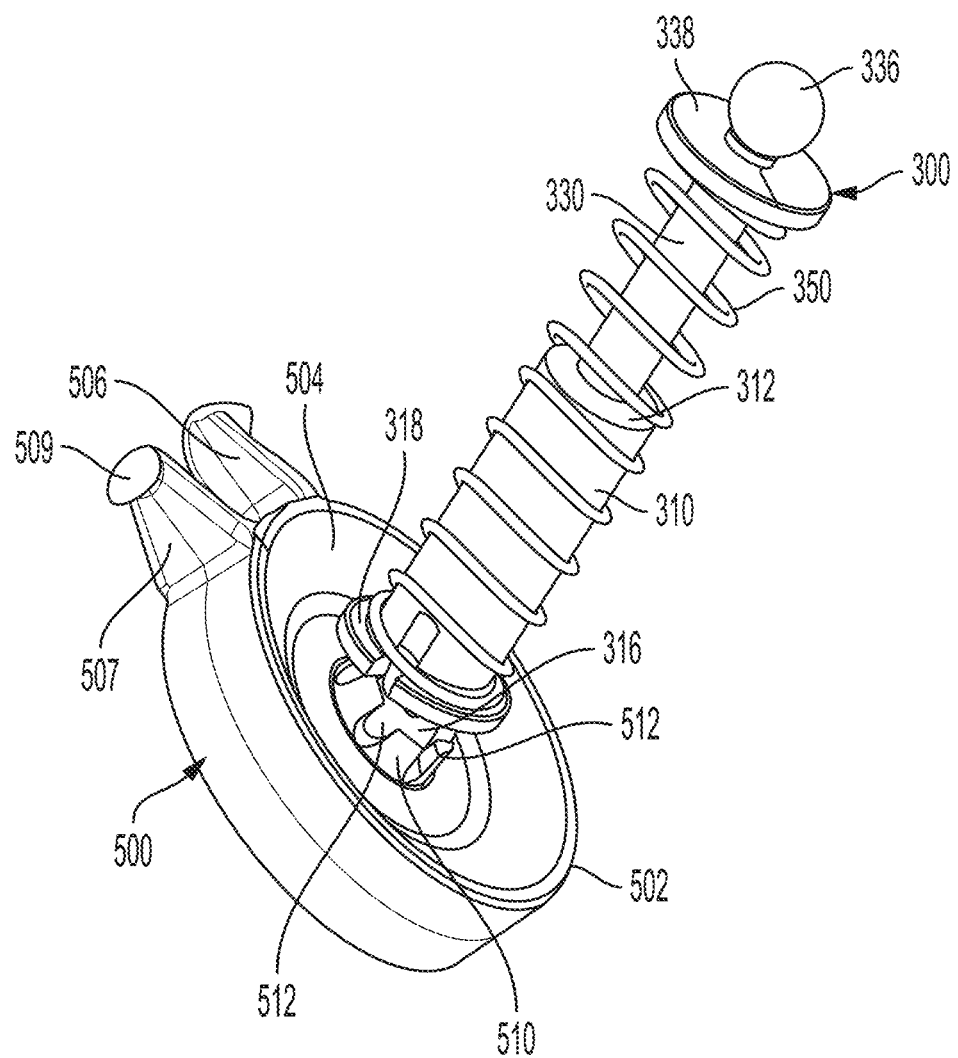
FIG. 14 is an isolated perspective view of a telescoping spring retention assembly coupled to a reversible valve member for use in a check valve assembly in accordance with the subject disclosure.
Figure 15:
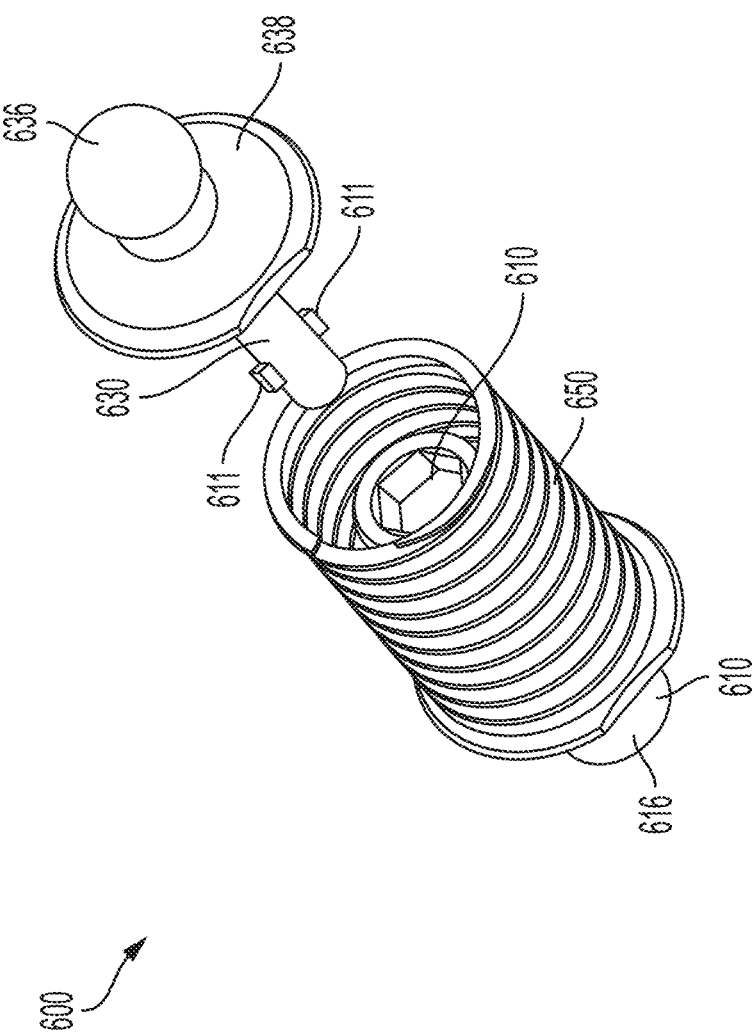
FIG. 15 is perspective exploded view of another telescoping spring retainer assembly for a check valve assembly for a BFP assembly in accordance with the present disclosure.

Referring now to FIG. 14, an isolated perspective view of the telescoping spring retention assembly 300 coupled to the reversible valve member 500 in accordance with the subject disclosure is shown. Again, if the valve member 500 becomes damaged in the field (e.g., one of the cups 512 become broken), the valve member 500 can simply be flipped and reinstalled without tools in the check valve assembly. Similarly, the orientation of the valve member 500 and spring retention assembly during initial assembly is not important, which makes assembly easier.

Referring now to FIGS. 15-18, various views of another spring retainer assembly 600 are shown. Similar elements to those described in connection with above-described embodiments are indicated with the like reference numbers in the "600" series. Many elements are essentially the same as those of the foregoing embodiments and, thus, are not further described herein. Thus, the following description relates to the differences of the spring retainer assembly 600.

Figure 17:
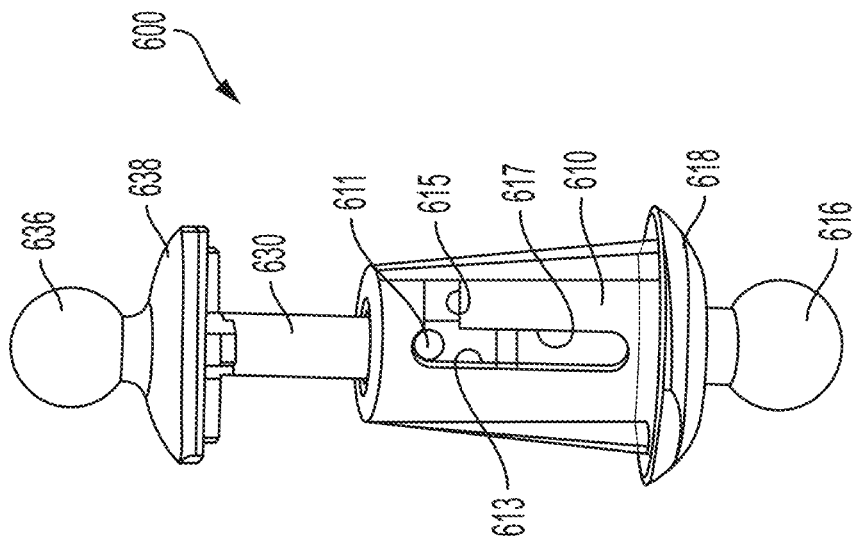
FIG. 17 is another side view of the telescoping spring retainer assembly of FIG. 15.

The spring retainer assembly 600 has a piston portion 630 with opposing buttons 611 near the end 632 for coupling to the cylinder portion 610. The cylinder portion 610 forms opposing two-part slots 613 that capture the buttons 611 to guide the telescoping motion. Each two-part slot 613 has a cross-wise portion 615 and an axial portion 617. During normal operation, the buttons 611 are captured in the axial portion 617 of the two-part slots 613 to guide linear motion and prevent the spring retainer assembly 600 from coming apart if the test cover is opened or removed. As shown in FIG. 17, the spring retainer assembly 600 is fully extended.

Figure 16:
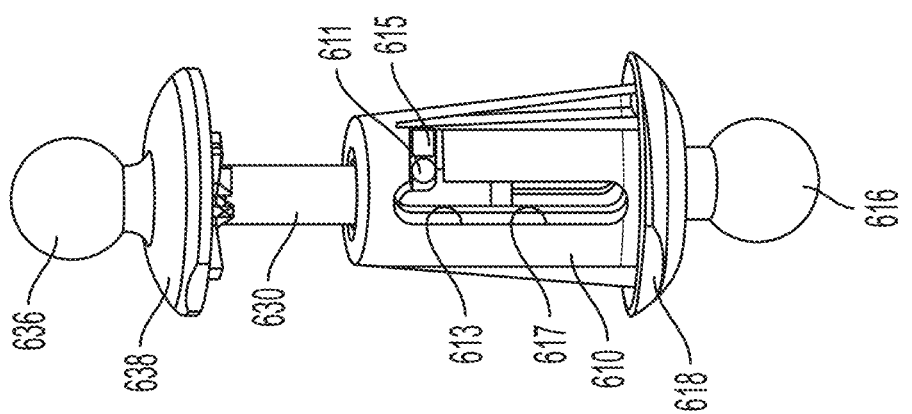
FIG. 16 is a side view of the telescoping spring retainer assembly of FIG. 15 with the spring removed.
Figure 18:
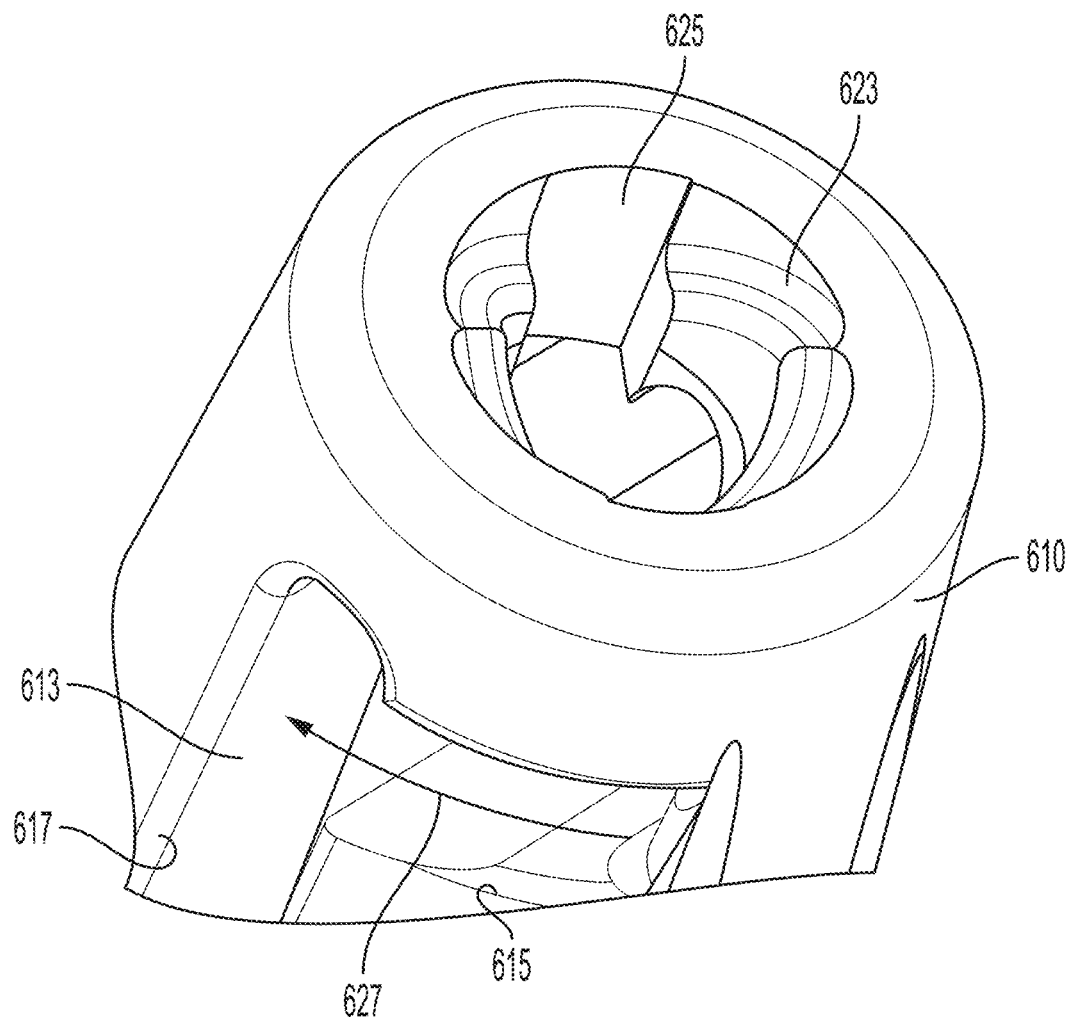
FIG. 18 is a partial perspective view of the cylinder portion of the telescoping spring retainer assembly of FIG. 15.

To assembly the spring retainer assembly 600, the piston portion 630 is pressed into the cylinder portion 610. The cylinder portion 610 has angled internal ramps 623 that guide the buttons 611 into axial grooves 625. The axial grooves 625 guide the buttons 611 in the cross-wise portion 615 of the two-part slot 613 (FIG. 16). Once the buttons 611 are in the slot 613, the piston portion 630 can be rotated along arrow 627 as shown in FIG. 18 to be in the operational position within the axial portion 617 of the slot 613. In another embodiment, the buttons 611 are push-buttons that retract during insertion into the slot 613. In still another embodiment, the slot 613 extends toward the open end (e.g., along the line of the groove 625). The cylinder portion 610 may also be somewhat deformable so that the cylinder portion 610 can be flexed to insert the buttons 611 in the slots.

Figure 19:
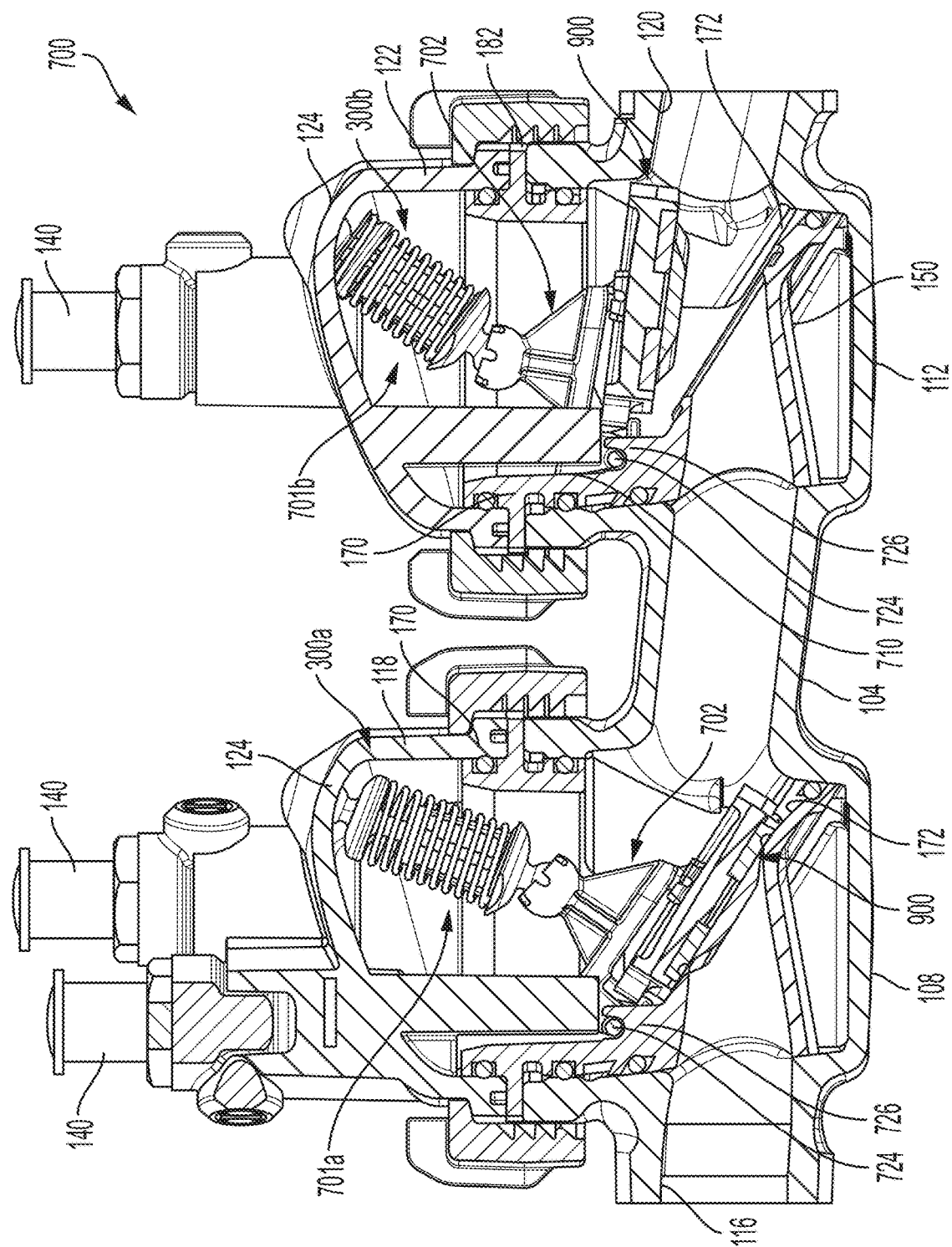
FIG. 19 is a cross-sectional view of a BFP assembly in accordance with the present disclosure with only the second valve assembly open for illustration.

Referring now to FIG. 19, a BFP assembly 700 is shown in accordance with an aspect of the present disclosure. As will be appreciated by those of ordinary skill in the pertinent art, BFP assembly 700 discussed herein utilizes similar principles to the BFP assembly 100 described above. The BFP assembly 700 differs from the BFP assembly 100 of FIGS. 1 and 2 in that a linkage 702 is employed. In normal operation, the BFP assembly 700 operates to carry fluid in only a forward direction, e.g., left to right in FIG. 19, from an inlet 116 to an outlet 120. The BFP assembly 700 operates to prevent flow in a backward direction, i.e., a direction from right to left in FIG. 19.

The BFP assembly 700 includes two valve assemblies 701a, 701b. For illustration, the first valve assembly 701a is in a closed position. The second valve assembly 701b, located downstream of the first valve assembly 701a, is in an open position.

Figure 20:
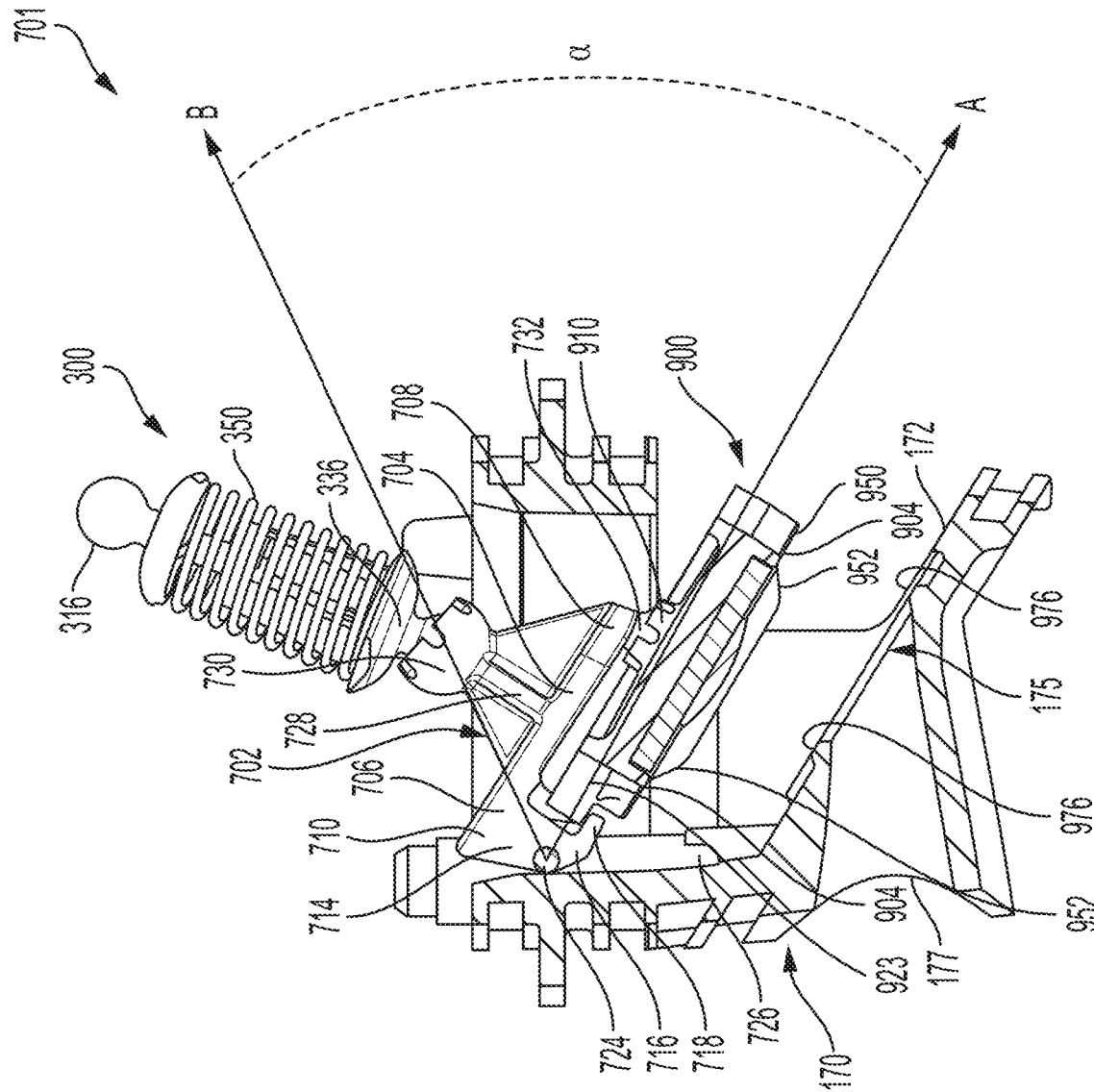
FIG. 20 is a partially exploded isolated perspective view of a spring retention assembly coupled to a linkage for use in a check valve assembly in accordance with the subject disclosure.

Referring now to FIG. 20, a partially exploded, cross-sectional side view of the linkage 702 that mounts to a frame 170 is shown. The frame 170 may be the same as shown in FIGS. 11A and 11B. The same reference numbers are used for the frame 170, valve seat 172, valve opening 175, lower portion 177, telescoping bias assembly 300, spring 350, closed free end 316, and free end 336. The linkage 702 is shown exploded from the frame 170. Each valve assembly 701a, 701b is the same so that the following description will generally refer to each as valve assembly 701. The linkage 702 may embody any feasible shape to accomplish one or more functional aspects described herein.

Figure 21:
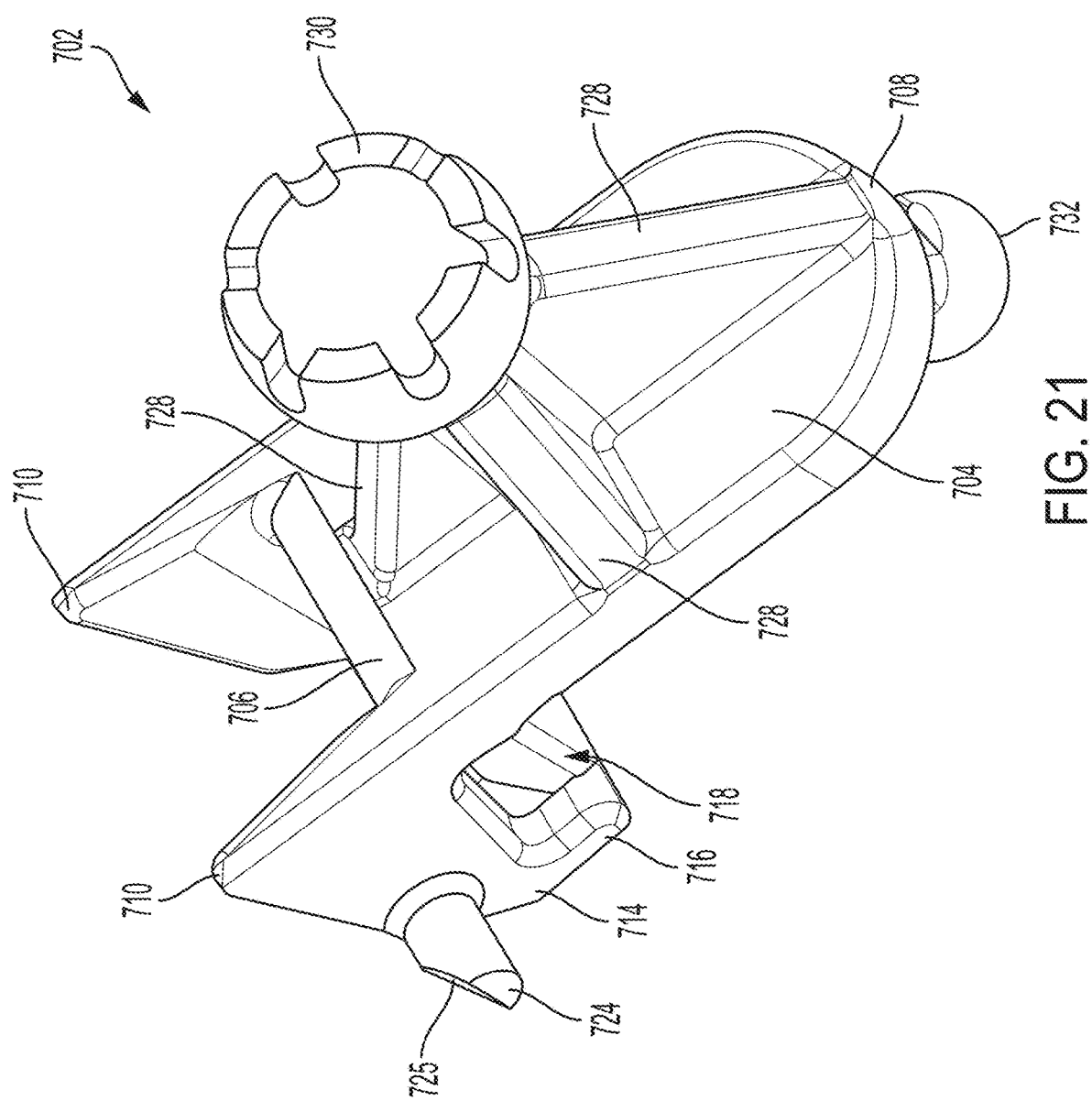
FIG. 21 is an isolated, overhead, perspective view of the linkage of FIGS. 19-20.
Figure 22:
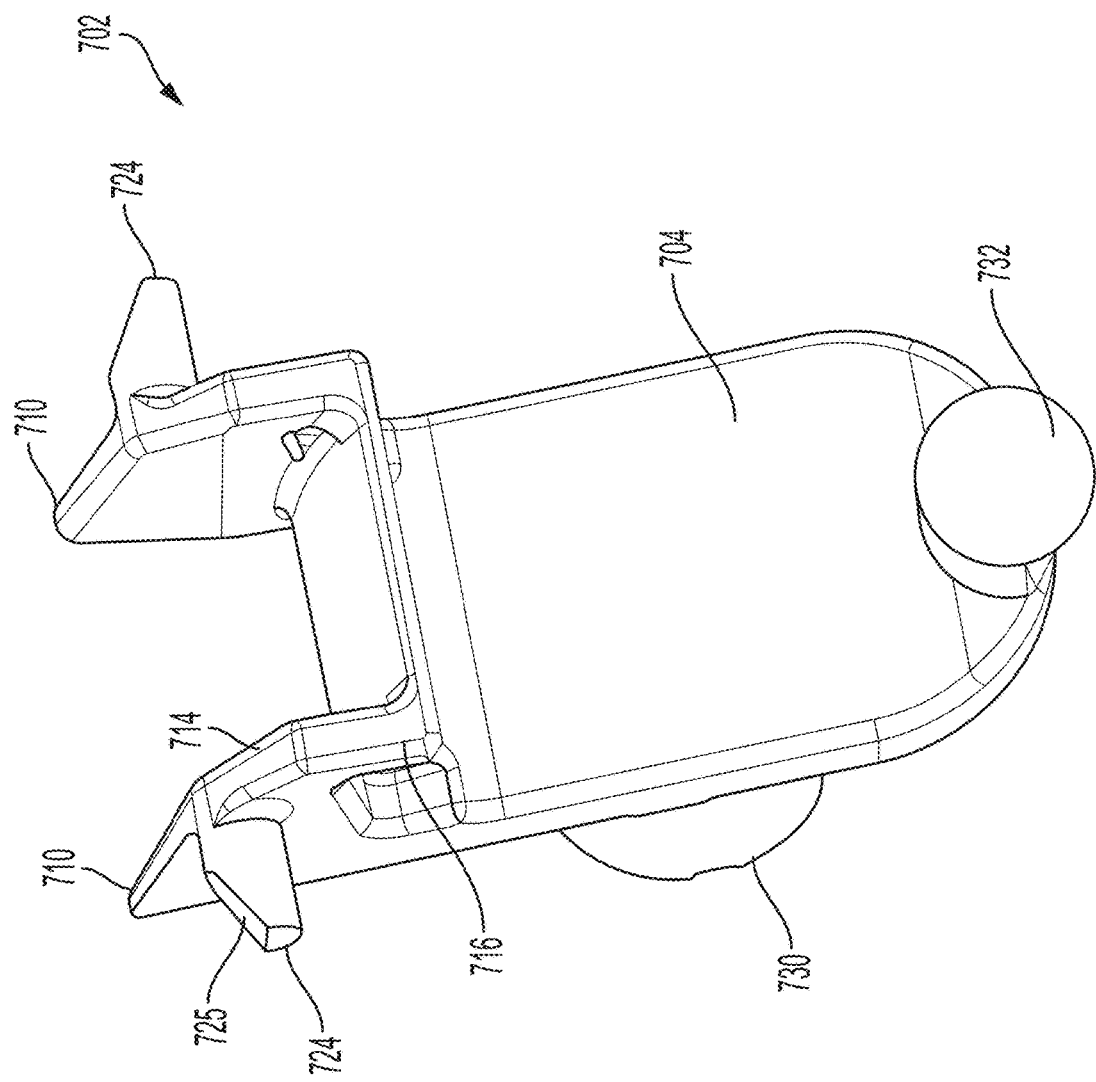
FIG. 22 is an isolated, bottom, perspective view perspective view of the linkage of FIGS. 19-21.

Referring to FIGS. 21 and 22, the linkage 702 is shown in isolation. The linkage 702 has a platform 704 serving as a supporting structure, which is typically fairly rigid. In a preferred implementation, the platform 704 has a relatively flat stage formation, extending along a plane. Alternatively, the platform 704 may define one or more conduit structures, formed together with gaps therebetween. The platform 704 may also form a scaffold, sheet, shelf, or like structure. During operation, the platform 704 and the valve member 400 may be positioned on substantially parallel planes.

The platform 704 includes a proximal end 706 and a distal end 708. Where the platform 704 has a planar surface, the proximal end 706 and distal end 708 may have a co-planar relationship. The distal end 708 has a round, parabolic shape such that the platform 702 defines a "U" shape portion. The proximal end 706 forms a stop 710. In the implementation shown, the stop 710 is a wing extending from the proximal end 706 of the platform 704. In other implementations, the stop 710 may include one or more wings extending from the platform 704. The stop 710 may also embody a button, hook, flange, cup, post or notch in other implementations.

The linkage 702 includes a branch 714 depending from the proximal end 706 of the platform 704. The branch 714 includes an arm 716 depending therefrom. The arm 716 has a "U" shape that defines an alcove 718, and wraps around to loosely and releasably capture the valve member 900, best seen in FIG. 20. Thus, the valve member 900 may move within the alcove 718 in one or more directions, such as linearly and rotation. The valve member 900 is positioned such that the arm 716 wraps around a skinnier lateral portion 923 or periphery of the valve member 900.

Referring still to FIGS. 21 and 22, a hinge pin 724 extends transversely from the branch 714. The hinge pin 724 is configured to demountably engage a slot 726 formed by the frame 170 of the valve assembly 701 (see FIG. 19). The hinge pin 724 includes a sloped surface 725 for ease of installation into the slot 726. The shape of the slot 726 may embody an indentation, notch, catch, or receiving member defined by the frame 170 of the valve assembly 701.

The linkage 702 includes a strut 728 extending from the platform 704 in a direction opposite the direction that the branch 714 depends. In other implementations, the linkage 702 may include more than one strut 728, be a simple post, or have no struts. The platform 704 defines the strut 728 such that the platform 704 and strut 728 are formed together. Alternatively, the strut 728 may be connected to the platform 704 by a hinge, a flexible leaf spring, an adhesive, nut and bolt assembly, weld, or a similar technique. The strut 728 supports a first coupling member 730.

Referring to FIG. 20, the linkage 702 has a first Axis "A", defined as a line from the hinge pin 724 through the valve member 900, and a second Axis "B", defined as a line from the hinge pin 724 extending along the strut 728 through a center of the first coupling member 730. The angle between Axes A and B is referred to herein as the strut angle α.

Referring again to FIG. 21, in a preferred implementation, the first coupling member 730 may be formed to receive a spherical shape. The first coupling member 730 may include a hollow, spherical structure, sliced above an orthodrome. In this regard, the first coupling member 730 may include a retention cup. The first coupling member 730 may flex and deform slightly to receive the closed free end 316 or the free end 336 of the piston portion 330 of the spring retainer assembly 300 without requiring any tools.

Once popped in, the bulbous end of the closed free end 316 or the free end 336 easily rotates within the first coupling member 730. That is, the closed free end 316 or the free end 336 forms a loose fit with the first coupling member 730. In other implementations, the first coupling member 730 may be connected to the closed free end 316 or the free end 336 by any other suitable connection means such as a hinge, a flexible leaf spring, an adhesive, nut and bolt assembly, weld, or a similar technique.

Referring now to FIG. 22, a bottom perspective view of the linkage 702 is shown. A second coupling member 732 depends from the distal end 708 of the platform 704. In the embodiment shown, the second coupling member 732 extends from an underside of the frame 704, on an opposite side of the frame 704 as the first coupling member 730. The second coupling member 732 may form a spherical or ball shape.

Referring back to FIGS. 19 and 20, a receiving member 910 defined by the valve member 900 captures the second coupling member 732 and allows for rotational movement therein. The second coupling member 732 can rotate against the curved surface of the receiving member 910. As such, the second coupling member 732 forms a loose fit with the receiving member 910. The receiving member 910 may form a retention cup such as that described with reference to the first coupling member 730. Once captured, the second coupling member 732 can smoothly rotate within the receiving member 910 like a ball-and-socket joint. In other implementations, the second coupling member 732 may form a peg shape, and the receiving member 910 may form a socket such that the second coupling member 732 can rotate into, or engage with the receiving member 910.

When assembled, the hinge pin 724 extending from the branch 714 is configured to demountably engage the slot 726 defined by the frame 170 of the valve assembly 701. The hinge pin rests or sits in the slot 726 but is not restrained therein. Similar to the BFP assembly 100 in FIG. 2, where the valve member 200 is connected to the frame 170 by a hinge portion 206 that allows rotation of the valve member 200 away from the valve seat 172 to open flow, the linkage 702 may be positioned to rotate clockwise or counter-clockwise within the slot 726 relative to the hinge pin 724 along an axis coming out of the page of FIG. 23, referred to herein as Axis "C" (not shown). As can be seen, the geometric features of the valve assembly 701 allow for tool-less and fastener-less drop-in assembly. As a result, the valve assembly is easier to service and less costly to manufacture.

The spring retainer assembly 300 provides a biasing force to urge the valve member 900 against the valve seat 172 (e.g., normally closed), the linkage 702 rotates clockwise relative to Axis C such that the sealing region 904 of the valve member 900 and the sealing surface 976 of the valve seat 172 are sealingly engaged to close the opening 175. The valve element 900 seats with relatively less force upon the valve opening 175 because of the play in the valve assembly 701.

In particular, the lateral portion 923 of the valve element 900 fits loosely within the alcove 718 of the linkage 702. As a result, the valve element 900 orients itself to be coplanar with the valve sealing surface 976 or seat 172 that forms the valve opening 175. In more detail, the valve element 900 can rotate about Axis A and Axis C because of the float in the alcove 718 and rotational movement of the receiving member 910 about the coupling member 732. When the valve element 900 is coplanar to the valve seat 172, misalignment from manufacturing imperfections and the like that may require additional sealing force, are overcome.

The coupling member 730 and the receiving member 910 may also provide additional loose fits or float to reduce the kinematic constraint of the valve element 900 when closing the valve opening 175. A bottom 950 of the valve element 900 with an angled surface 952 may also act as a guide to center the valve element 900 into the closed position. Thus, the valve element 900 easily by adjusting to avoid misalignment that could cause additional sealing force to compress the sealing area and seal the valve.

Still referring to FIGS. 19 and 20, when the upstream fluid pressure exceeds the urging force of the spring retention assembly 300 and the downstream fluid pressure on the valve member 900, the linkage 702 rotates counter-clockwise relative to Axis C such that the valve member 900 disassociates with the valve seat 172. The linkage 701 increases the mechanical advantage of the opening force on the valve element 900 so that the upstream fluid forces can move the valve element 900 to a fully open position. As a result, the pressure drop across the BFP valve is decreased.

The linkage 702 provides a mechanical advantage between the fluid force and the spring force, wherein the mechanical advantage is controlled by the strut angle α. Generally, a larger strut angle α corresponds with increased upstream fluid force leverage as the valve assembly 701 opens. As shown, the strut angle α is less than 90 degrees. The arrangement of the hinge pin 724, the coupling member 730 and receiving member 910 also may impact the mechanical advantage. As shown, by being centrally located, the coupling member 730 is approximately midway between the hinge pin 724 and receiving member 910.

In the fully open position (e.g., valve assembly 701b in FIG. 19), the stop 710 contacts the frame 170 to halt the counter-clockwise rotation of the linkage 702. Without the stop 710, the linkage 702 could over-rotate so that spring torque reversal could occur. In other words, in spring torque reversal, the telescoping spring bias assembly 300 would effectively begin to push the valve element 900 open, which would require manual intervention for closing. The selection of the strut angle α and arrangement of the components, such as the stop 710, is made to prevent such spring torque reversal.

Referring now to FIG. 23, an isolated perspective view of another valve assembly 801 having similar advantages is shown. The valve assembly 801 differs from the valve assembly 701 in that another implementation of the linkage 802 is used. As will be appreciated by those of ordinary skill in the pertinent art, the linkage 802 utilizes similar principles to the linkage 702 described above. Accordingly, like reference numerals for the linkage 802 preceded by the numeral "8" instead of the numeral "7", are used to indicate like elements. The following description is directed to the differences between the linkages 702, 802.

The proximal end 806 of the linkage 802 defines a linkage slope 804 having a squared-off shape, sloping in a distal direction, along, for example, a length of the branch 814. In this implementation, the linkage 802 does not include a protruding stop as is the case of linkage 702, but rather, the branch 814 is sized to contact the frame (not shown) or some portion of the valve assembly (e.g., the housing) to define a fully open position.

Alternatively, a stop is defined by the frame (not shown) of the valve assembly 801 or the housing 104 the BFP assembly. Where the frame of the valve assembly 801 forms a stop, rotation of the linkage 802 of FIG. 23 is halted when the stop on the frame 170 makes contact with the proximal end 706 (e.g., the linkage slope 804) of the linkage 802. Thus, spring torque reversal is prevented while still being able to create a mechanical advantage for full opening with a strut angle α.

As can be seen, the subject disclosure provides many improvements to BFP assemblies. For example, without limitation, the assembly can be assembled and installed without tools, which is not only helpful for initial manufacture but in-field replacement. The subject BFP assemblies also provide a stop on either the linkage and/or the frame of the BFP assembly to prevent the valve member from opening at an angle allowing the urging force of the spring retention assembly to hold the valve member open. Additionally, an adaptable, loose, coupling configuration between the linkage and the valve member allows the valve member to adjust and self-align against the valve seat. Further, the linkage provides a mechanical advantage so that the valve can fully open to reduce pressure drop across the check valve.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, spring retention assemblies, and the like) shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A check valve for a backflow prevention assembly, comprising:
   a flexible linkage with platform having a proximal end and a distal end;
   a first coupling member supported by the platform for engaging a spring retention assembly, the first coupling member centrally located above the platform by a strut;
   a stop protruding from the proximal end of the platform to engage a portion of the check valve for limiting travel of the platform;
   a branch depending from the proximal end of the platform, the branch having a hinge pin configured to nest in a slot defined by the check valve; and
   a second coupling member depending from the distal end of the platform for engaging a valve member.

2. The check valve of claim 1, wherein the branch forms an alcove, a periphery of the valve member fitting in the alcove.

3. The check valve of claim 2, wherein the hinge pin, alcove, first coupling member, and second coupling member allow self-alignment of the valve member relative to a valve opening.

4. The check valve of claim 1, wherein the hinge pin, first coupling member, and second coupling member form a triangle to increase a mechanical advantage to help fully open the valve member.

5. The check valve of claim 1, wherein the stop is one or more wing appendages.

6. The check valve of claim 1, wherein the branch, hinge pin, first coupling member, and second coupling member of the check valve allow for tool less and fastener-less drop-in assembly into a housing of the backflow prevention assembly.

7. A check valve for a backflow prevention assembly, comprising:
   a flexible linkage with a platform having a proximal end and a distal end, the platform having one or more struts extending therefrom;
   a first coupling member supported by the platform for engaging a bias assembly;
   a branch depending from the proximal end of the platform, the branch having a hinge pin configured to nest in a slot defined by the check valve; and
   a second coupling member depending from the distal end of the platform for engaging a valve member, wherein:
   a first axis from the binge pin to the first coupling member and a second axis from the hinge pin to the second coupling member form a strut angle that increases a mechanical advantage for fully opening the valve member to decrease pressure drop across the check valve, a height of the one or more struts of the platform determining the strut angle.

8. The check valve of claim 7, further comprising a stop protruding from the proximal end of the platform to engage a portion of the check valve for limiting travel of the platform.

9. A backflow prevention assembly comprising;
   a valve member having a first side and a second side, the first side having a receiving member, and the second side forming a sealing region;
   a check valve including:
      a flexible linkage having a proximal end and a distal end defining a plane;
      a first coupling member supported by the flexible linkage;
      one or more struts extending from the flexible linkage to support the first coupling member;
      a branch depending from the proximal end of the flexible linkage, the branch having a hinge pin configured to nest in a slot defined by a frame of the check valve, the branch having an arm forming an alcove;
      a stop protruding from the proximal end of the flexible linkage to engage the frame of the check valve for limiting travel of the flexible linkage; and
      a second coupling member depending from the distal end of the flexible linkage for engaging the receiving member; and
   a bias assembly engaged with the first coupling member, wherein:
      the arm loosely supports the valve member in the alcove and the receiving member of the valve member captures the second coupling member to allow for rotational movement therein to self-align to a valve opening, and
      a first axis from the hinge pin to the first coupling member and a second axis from the hinge pin to the second coupling member form a strut angle that increases a mechanical advantage for fully opening the valve member to decrease pressure drop across the check valve.

10. The backflow prevention assembly of claim 9, wherein the second coupling member and the receiving member are a ball and socket respectively.

11. The backflow prevention assembly of claim 9, wherein the hinge pin, the slot, the first coupling member and the bias assembly, the second coupling member and the receiving member, and the alcove all allow the valve member to self-align to a valve opening.

12. The backflow prevention assembly of claim 9, further comprising a second valve member, a second check valve, and a second bias assembly located within the backflow prevention assembly.

* * * * *